United States Patent [19]
Scaramucci

[11] Patent Number: 5,251,657
[45] Date of Patent: Oct. 12, 1993

[54] TOP-ENTRY CHECK VALVE WITH CARTRIDGE SECURED BY PROJECTIONS

[76] Inventor: John P. Scaramucci, 10724 Woodridden, Oklahoma City, Okla. 73170

[21] Appl. No.: 878,093

[22] Filed: May 4, 1992

Related U.S. Application Data

[62] Division of Ser. No. 761,594, Sep. 18, 1991, Pat. No. 5,143,113.

[51] Int. Cl.$^5$ .................... F16K 15/03; F16K 43/00
[52] U.S. Cl. .................... 137/315; 137/454.6; 137/527.8
[58] Field of Search .............. 137/515.7, 527, 527.8, 137/315, 454.2, 454.5, 454.6, 527.2

[56] References Cited

U.S. PATENT DOCUMENTS

| | | | |
|---|---|---|---|
| 326,549 | 9/1885 | D'Este | 137/527 |
| 483,635 | 10/1892 | Prince, Jr. | 137/454.2 |
| 992,849 | 5/1911 | Chalke | 137/454.6 |
| 1,772,086 | 8/1930 | Porter | 137/454.2 |
| 2,021,532 | 11/1935 | Wainford | 137/454.6 |
| 2,654,388 | 10/1953 | Glass | 137/527.8 |
| 3,366,137 | 1/1968 | Hansen | 137/527.8 |

*Primary Examiner*—George L. Walton
*Attorney, Agent, or Firm*—Dunlap, Codding & Lee

[57] ABSTRACT

A top-entry check valve having a seat, cage, disc and removable bonnet utilizes projections to prevent movement of the seat, cage and disc in the downstream direction. An annular shoulder in the valve body prevents movement of the seat, cage and disc in the upstream direction. The disc has a hinge pin which is cradled in hinge pin supports of the cage to hold the disc in place. Removal of the bonnet allows access to the valve chamber for replacement of the seat, cage or disc.

9 Claims, 21 Drawing Sheets

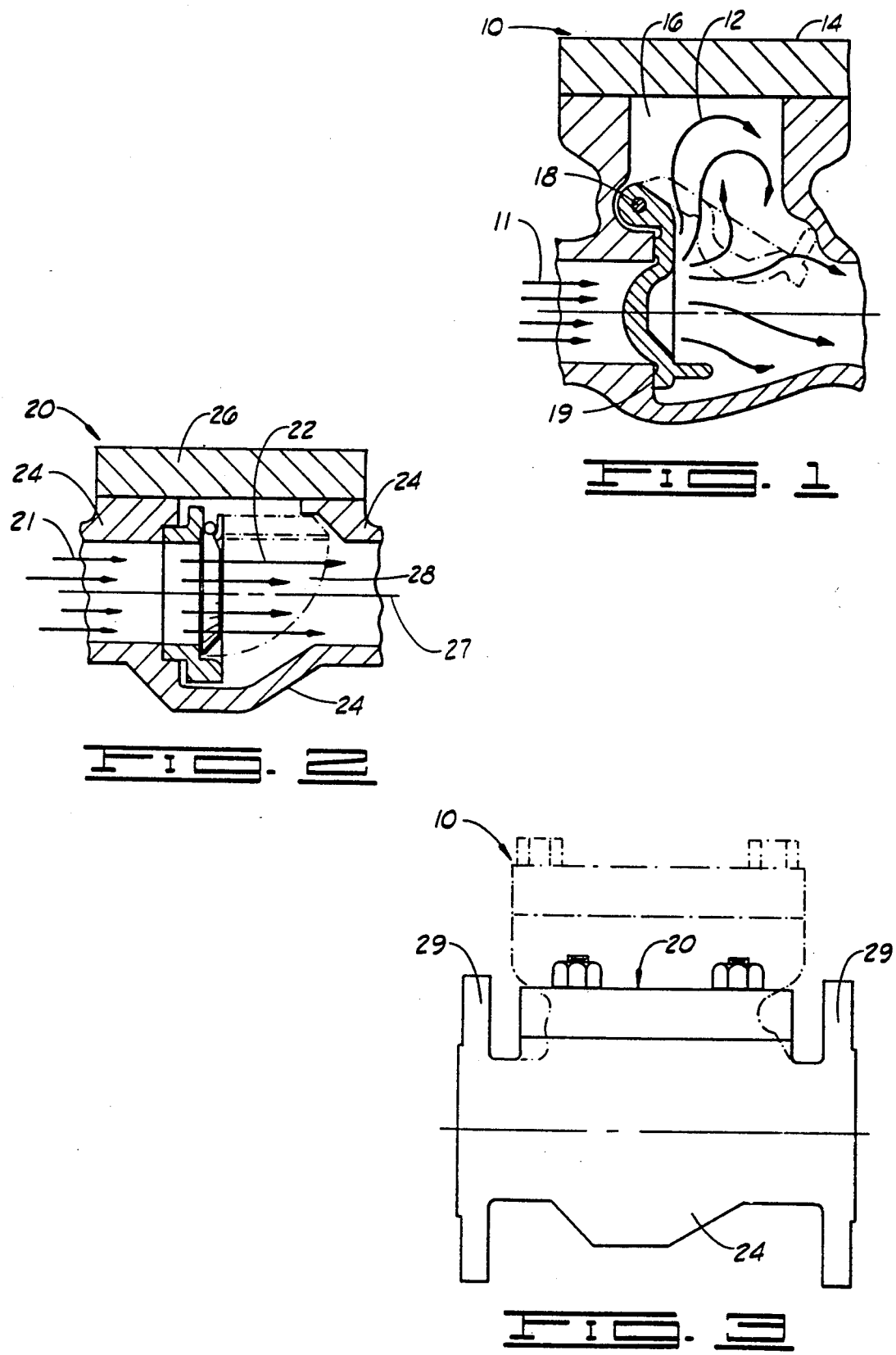

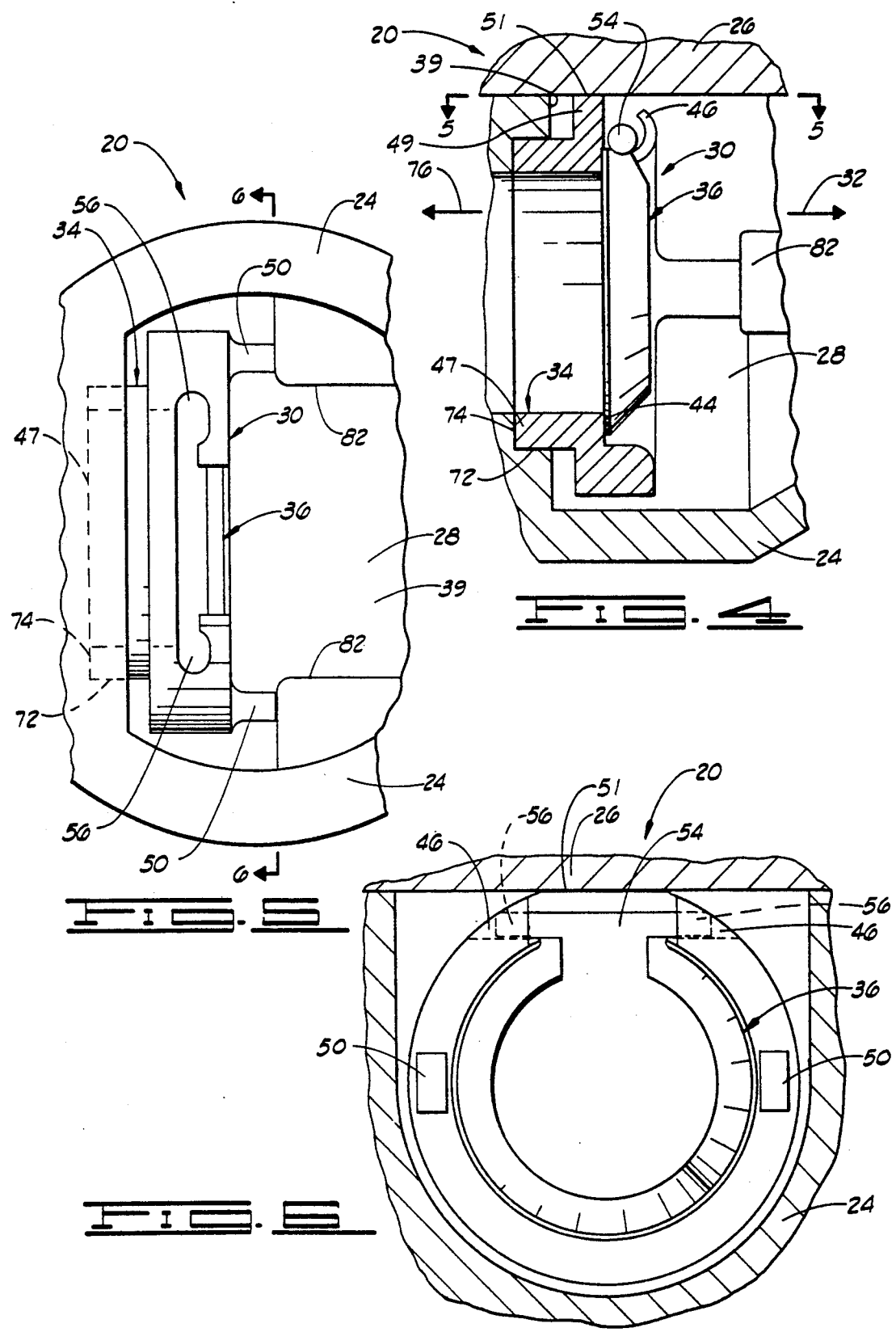

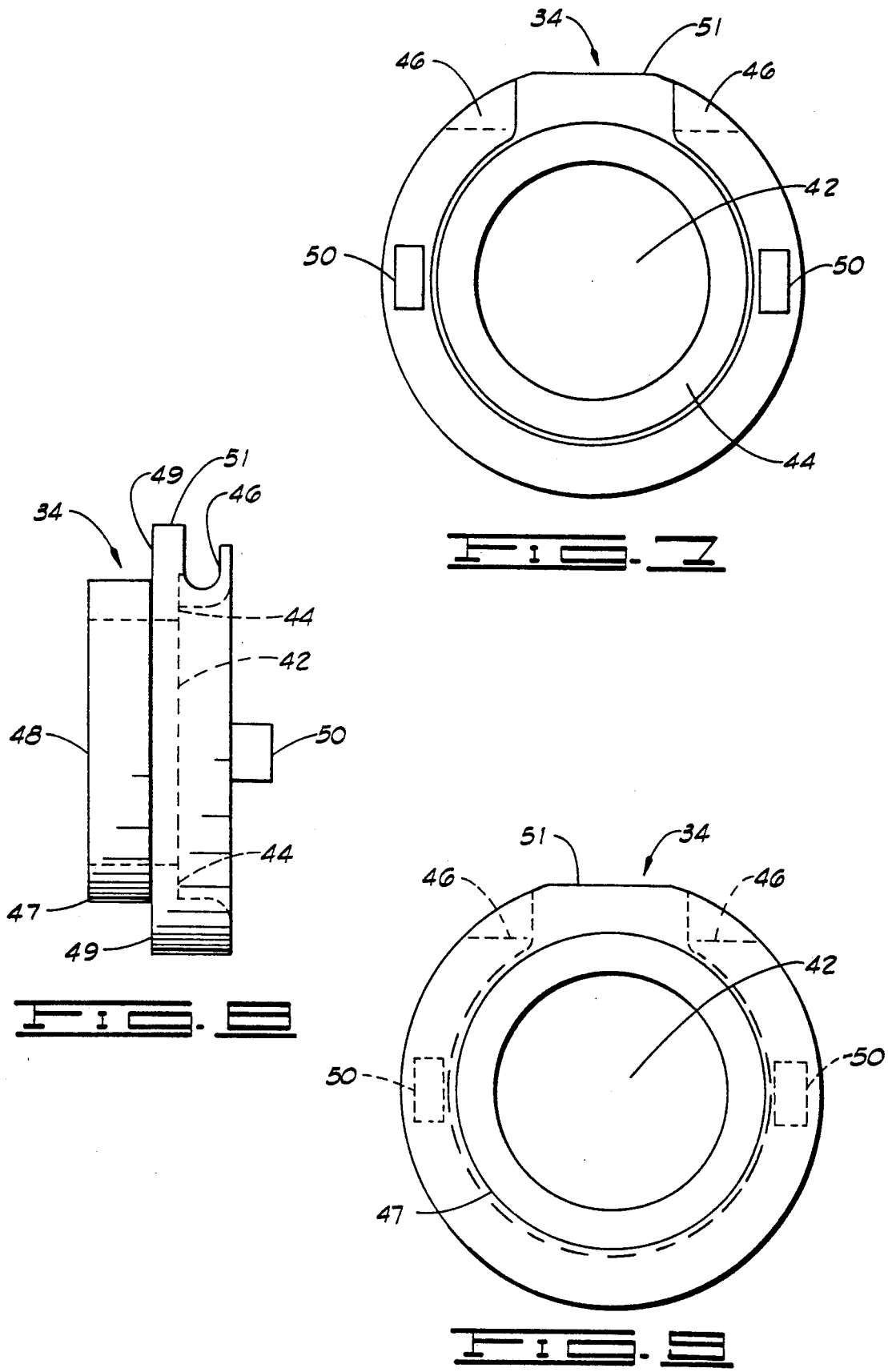

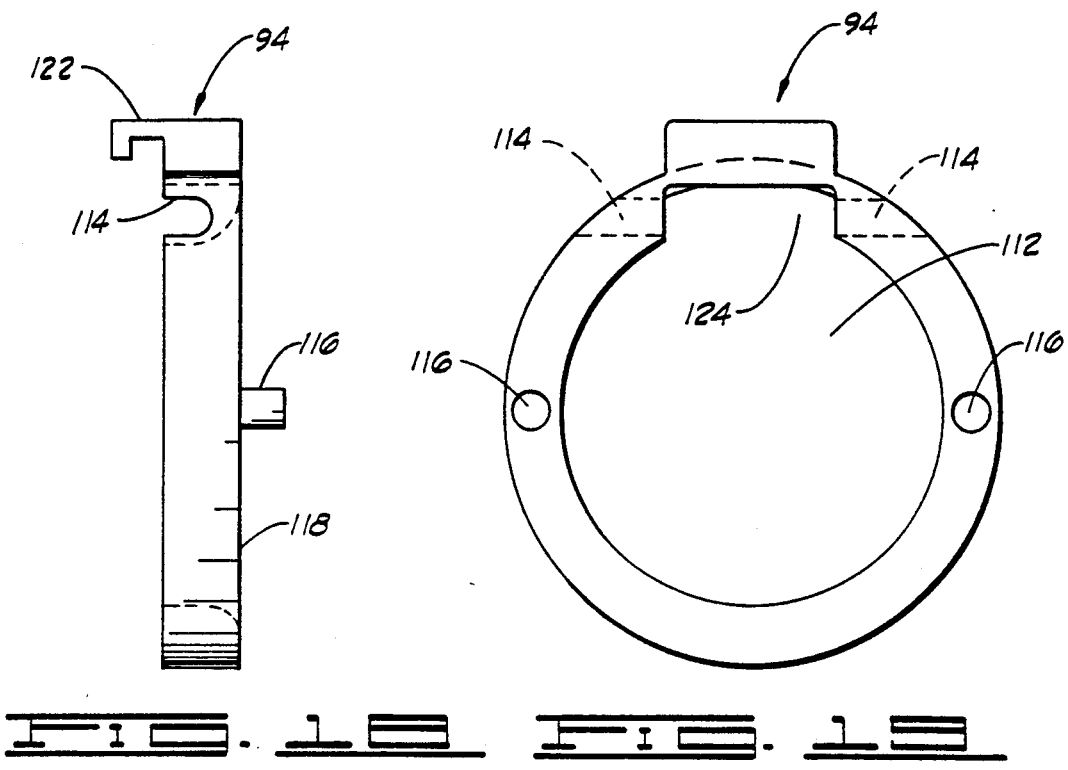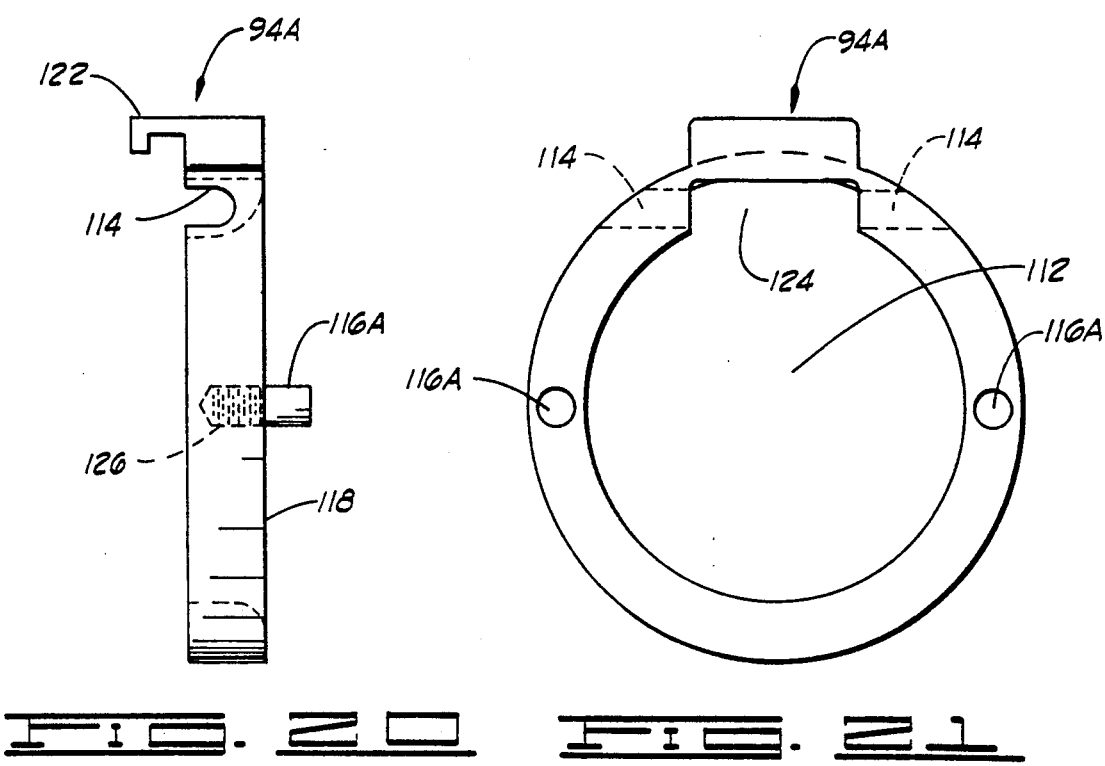

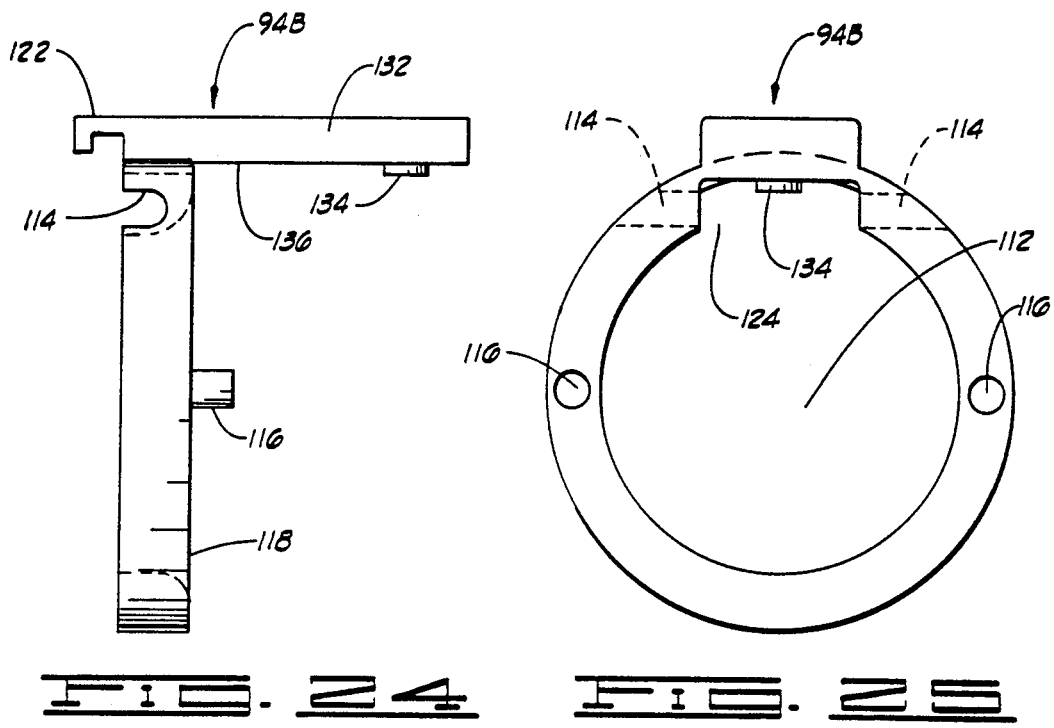
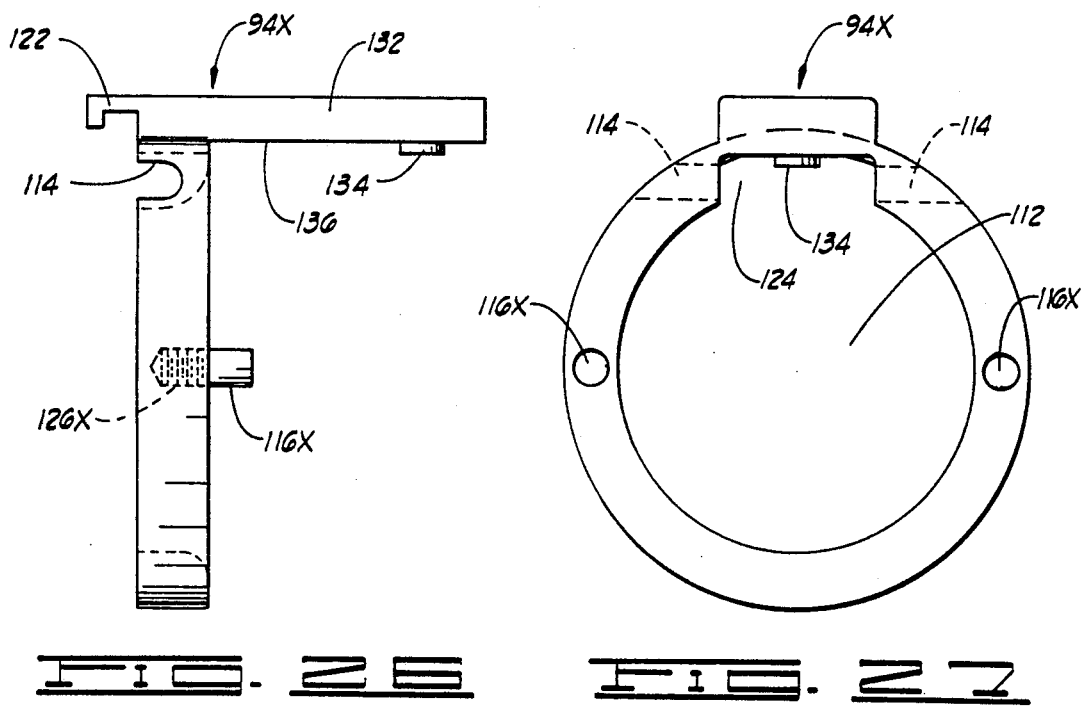

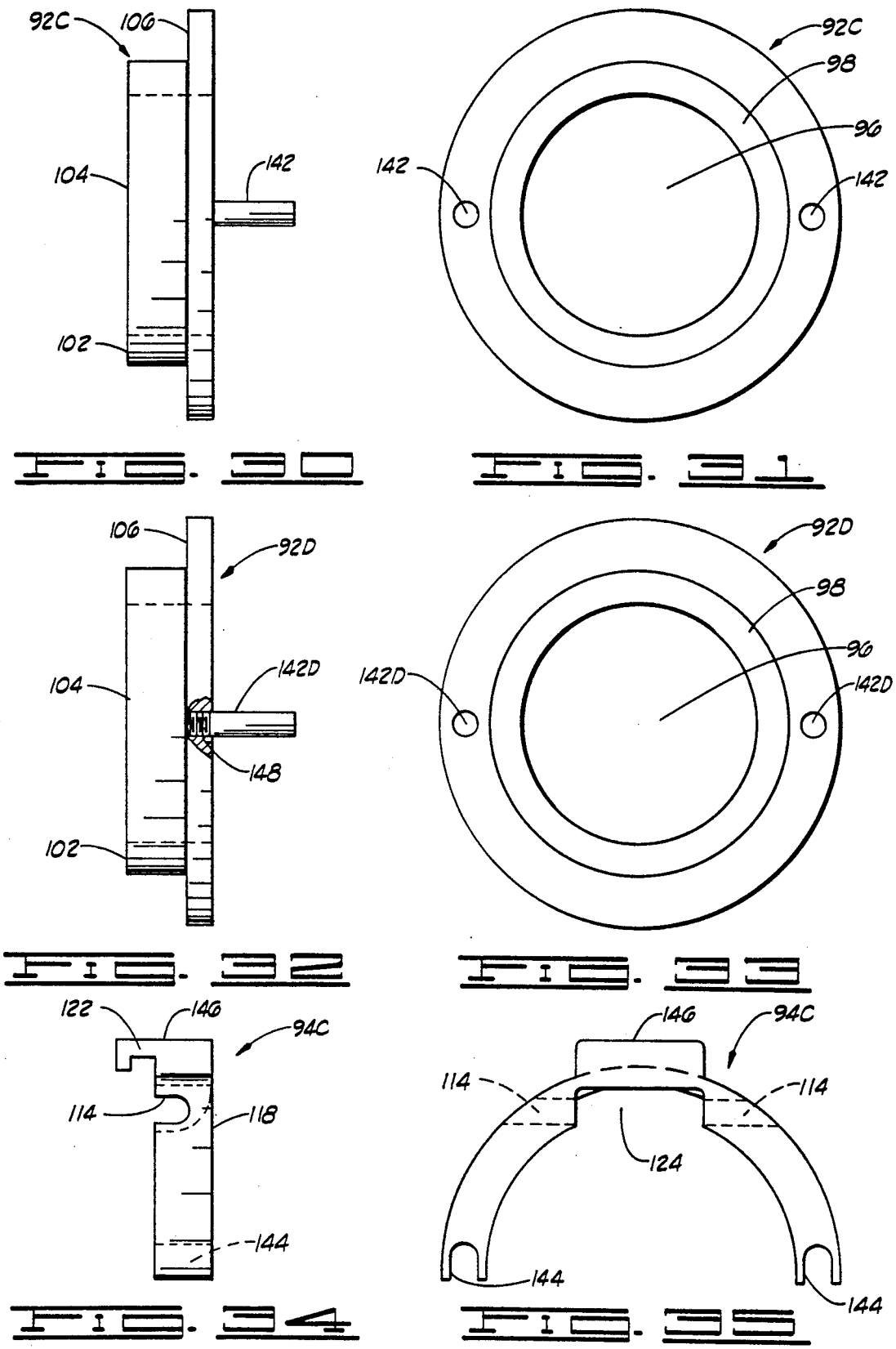

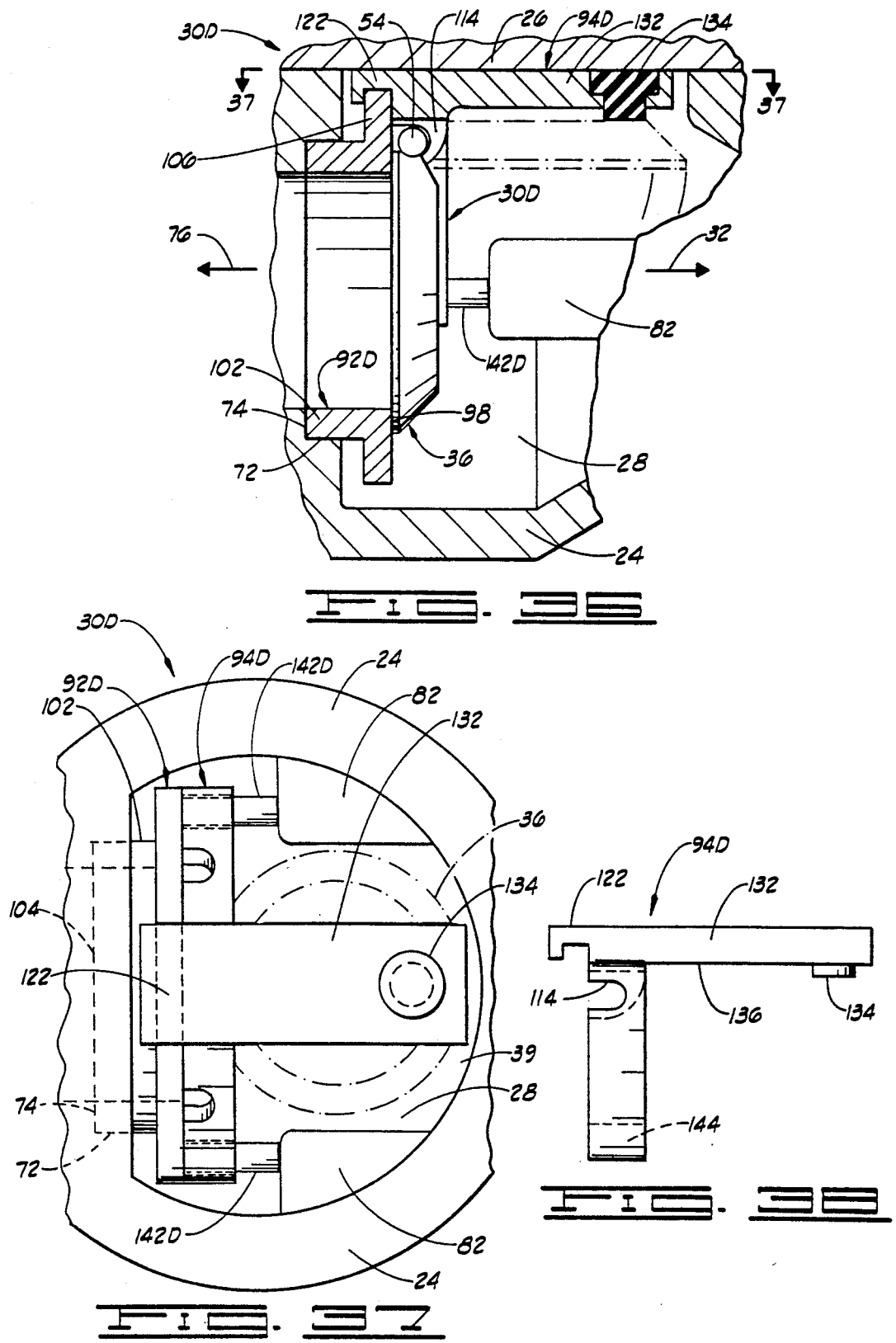

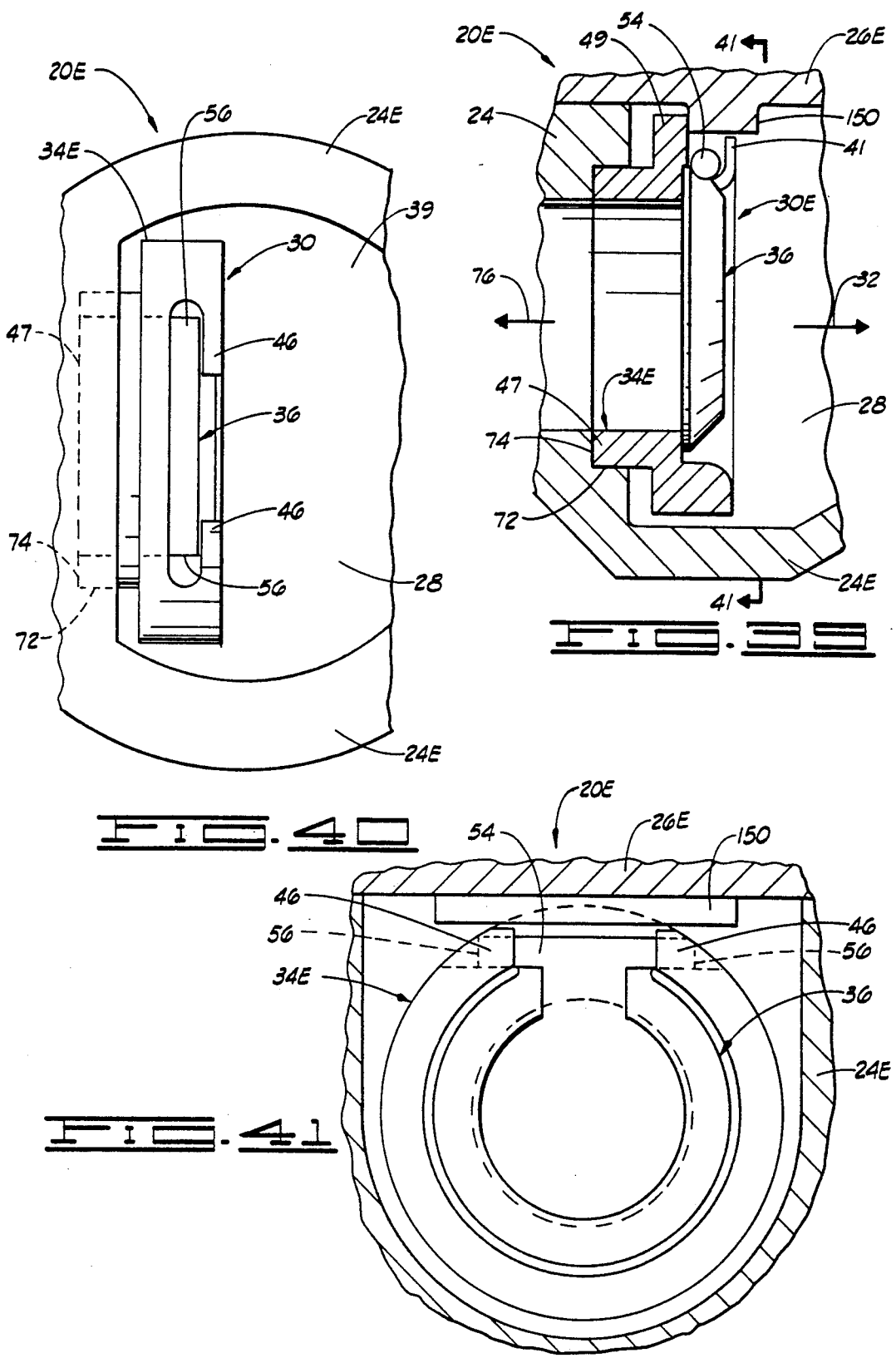

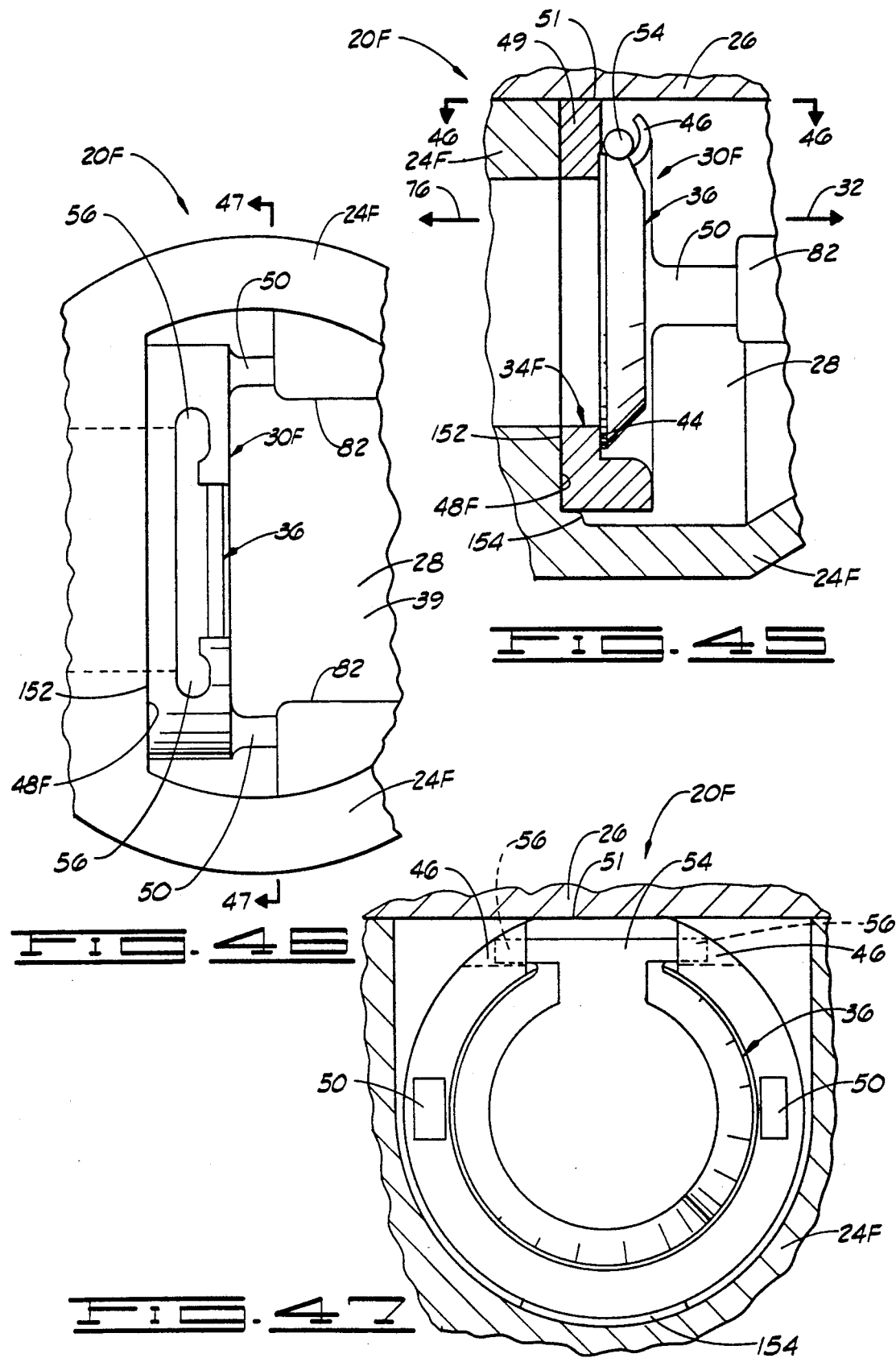

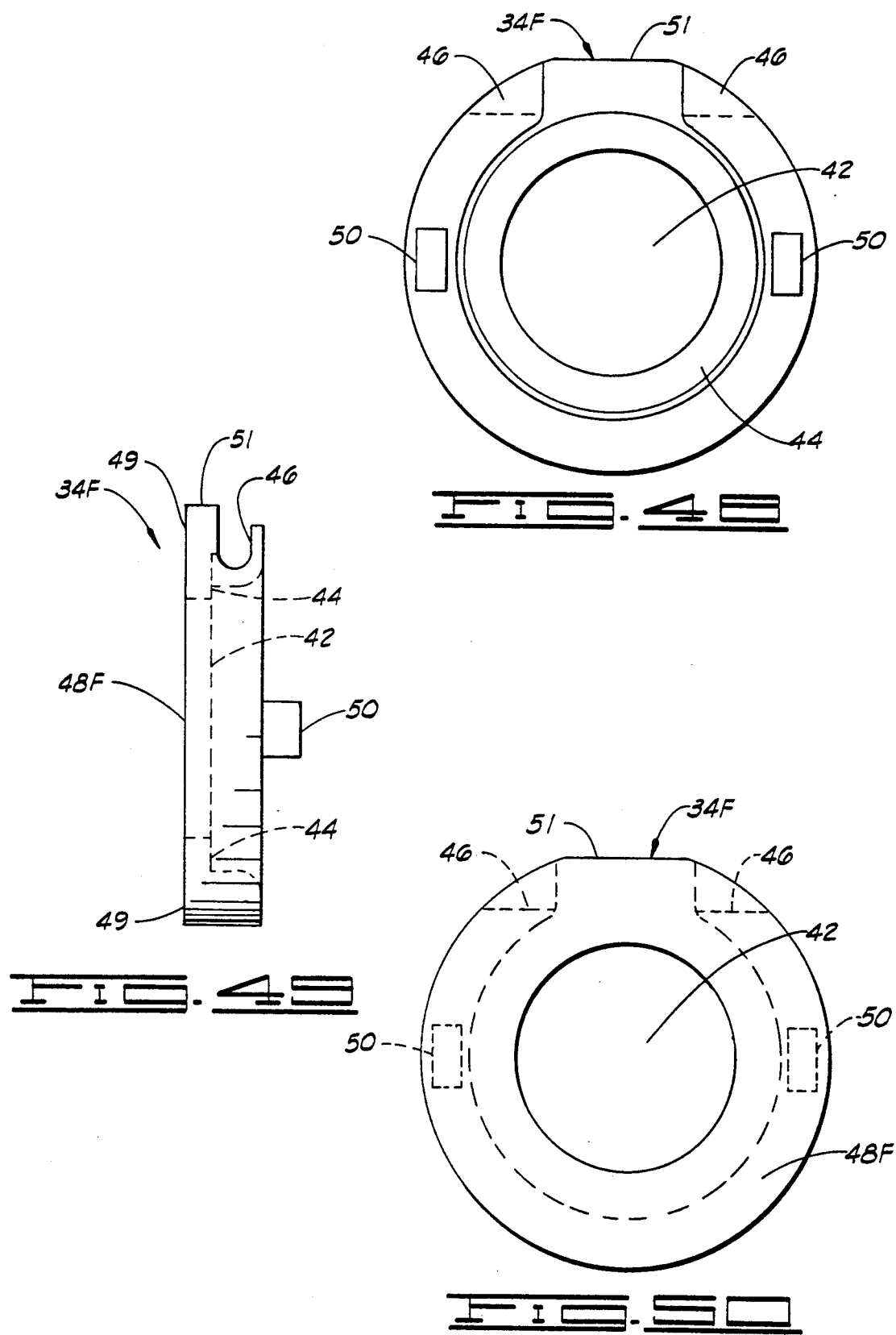

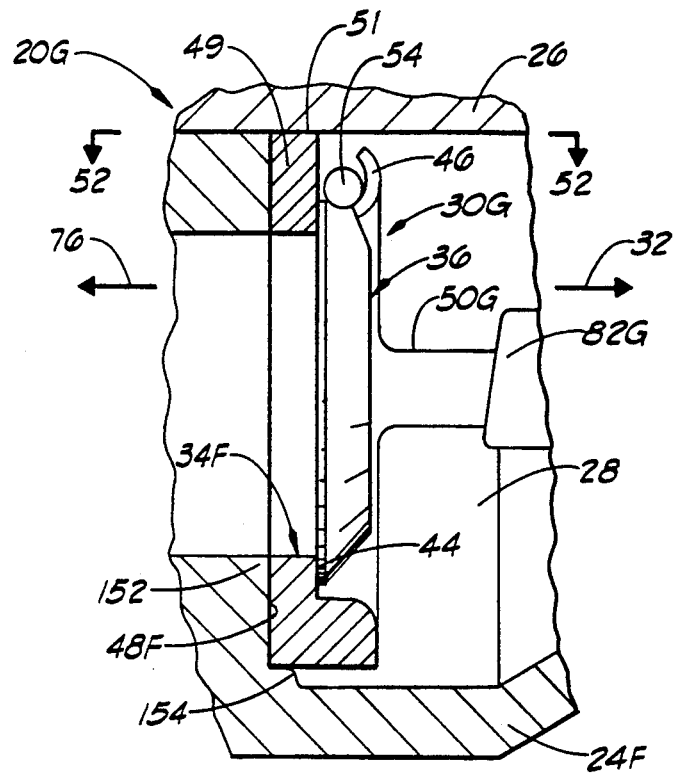
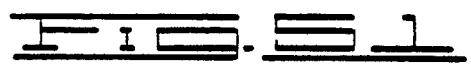
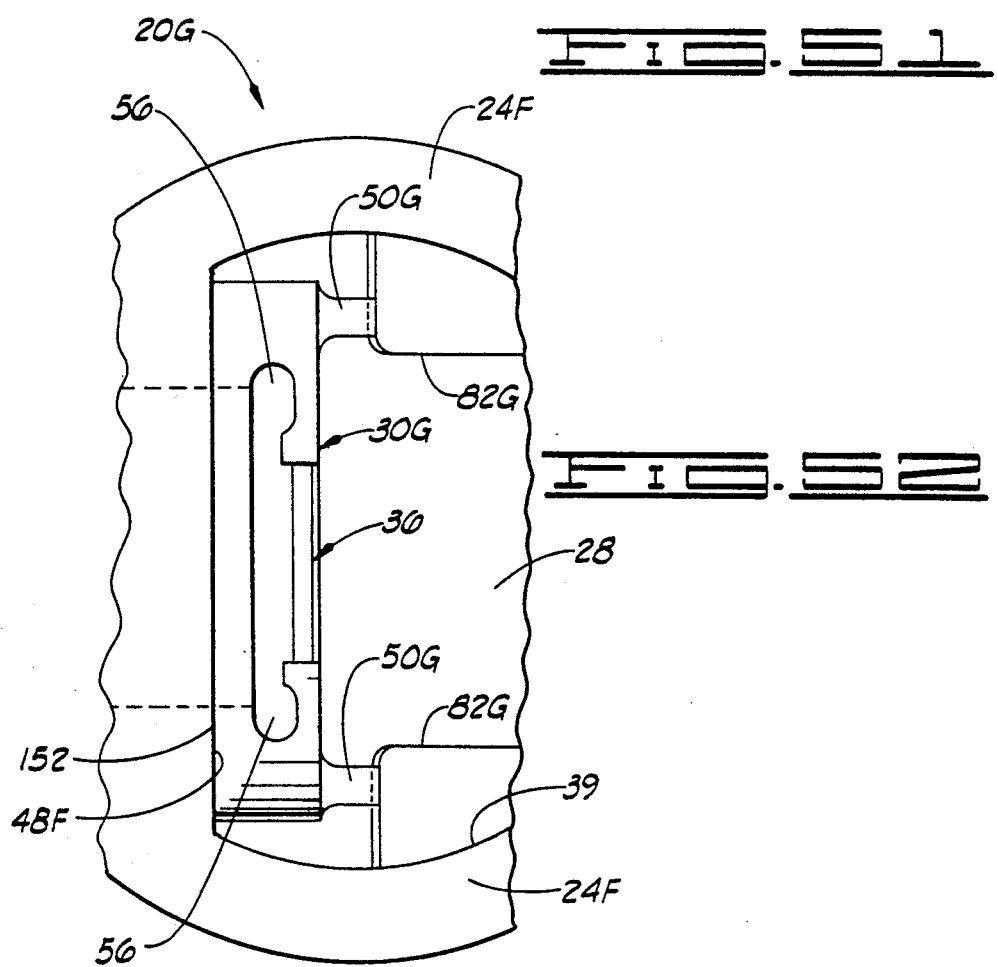
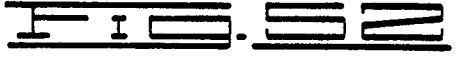

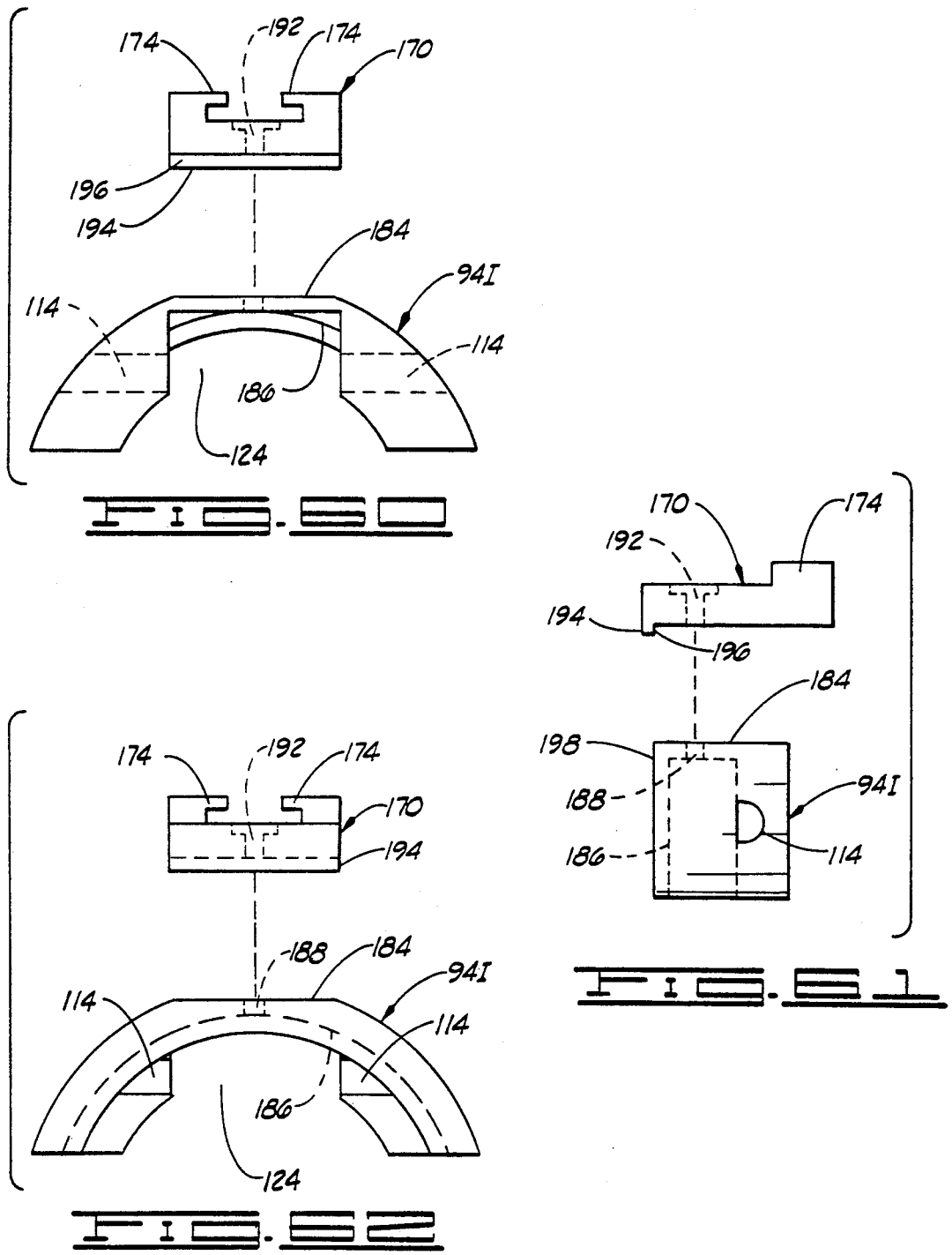

TOP-ENTRY CHECK VALVE WITH CARTRIDGE SECURED BY PROJECTIONS

This is a division of application Ser. No. 07/761,594 filed Sep. 18, 1991 now U.S. Pat. No. 5,143,113.

CROSS REFERENCE TO RELATED APPLICATIONS

This application is related to the following applications filed on a even date herewith:

Top-Entry Check Valve Having Retainer Ring, Ser. No. 07/762,104

Top-Entry Check Valve With Threaded Fasteners, Ser. No. 07/762,540

Top-Entry Check Valve With Screw-In Seat, Ser. No. 07/762,514

Top-Entry Check Valve Having Spring Retainer, Ser. No. 07/762,517

Top-Entry Check Valve With Cartridge Secured By Threaded Projections, Ser. No. 07/762,811

Top-Entry Check Valve With Pin Fasteners, Ser. No. 07/762/539.

1. Field of the Invention

This invention relates to improvements in top-entry swing check valves.

2. Summary of the Invention

The present invention provides a top-entry check valve with a smooth, straight chamber which minimizes both turbulence and pressure drop of the fluid passing through the valve. The relatively small cavity of this design allows an overall reduction in size and weight over conventional top-entry check valves.

The cartridge assembly of the valve includes a seat, a cage and a disc. The seat and cage may be a unitary structure in order to make replacement of the seat and cage more easily accomplished. The cage may have a downstream extension to prevent the disc from striking the valve body when the disc swings open. The downstream extension may have a cushion to lessen the impact of the disc with the downstream extension and thereby prolong the useful life of the disc and body.

A removable bonnet is attached over the access opening to the valve chamber. With the bonnet detached, the seat, cage and disc can readily be replaced.

An annular shoulder in the valve chamber prevents the valve cartridge from moving in an upstream direction. Projection means hold the valve cartridge against downstream movement.

Additional advantages and features will become apparent from the detailed description of the preferred embodiments of the invention when read in conjunction with the drawings and appended claims.

BRIEF DESCRIPTION OF THE DRAWINGS

FIG. 1 is a vertical cross-sectional view of a prior art top-entry check valve with turbulent flow.

FIG. 2 is a vertical cross-sectional view of a top-entry check valve constructed in accordance with the present invention and illustrating the smooth flow through the valve chamber.

FIG. 3 is a side elevation of a top-entry check valve constructed in accordance with the present invention with a prior art top-entry check valve shown in outline to illustrate the improved dimensions of the present invention.

FIG. 4 is a vertical cross-sectional view of a portion of a top-entry check valve constructed in accordance with the present invention.

FIG. 5 is a cross-sectional view taken along lines 5—5 of FIG. 6—6 of FIG. 4.

FIG. 6 is a cross-sectional view taken along lines 6—6 of FIG. 5.

FIG. 7 is an elevational view of the unitary seat and cage of the valve of FIGS. 4, 5 and 6 from the downstream side.

FIG. 8 is a side elevation of the unitary seat and cage of FIG. 7.

FIG. 9 is an elevational view of the unitary seat and cage of FIG. 7 from the upstream side.

FIG. 18 is a side elevation of the cage of the valve of FIGS. 13 and 14.

FIG. 19 is an elevational view of the cage of FIG. 18 from the downstream side.

FIG. 20 is a side elevation of another form of the cage of the valve of FIGS. 13 and 14.

FIG. 21 is an elevational view of the cage of FIG. 20 from the downstream side.

FIG. 24 is a side elevation of the cage of the valve of FIGS. 22 and 23.

FIG. 25 is an elevational view of the cage of FIG. 24 from the downstream side.

FIG. 26 is a side elevation of another form of the cage of the valve in FIGS. 22 and 23.

FIG. 27 is an elevational view of the cage of FIG. 26 from the downstream side.

FIG. 30 a side elevation of the seat of the valve of FIGS. 28 and 29.

FIG. 31 is an elevational view of the seat of FIG. 30 from the downstream side.

FIG. 32 is a side elevation of another form of the seat of the valve of FIGS. 28 and 29 with a portion broken away for clarity of illustration.

FIG. 33 is an elevational view of the seat of FIG. 32 from the downstream side.

FIG. 34 is a side elevation of the cage of the valve of FIGS. 28 and 29.

FIG. 35 is an elevational view of the cage of FIG. 34 from the downstream side.

FIG. 36 is a vertical cross-sectional view of a portion of still another form of top-entry check valve constructed in accordance with the present invention.

FIG. 37 is a cross-sectional view taken along lines 37—37 of FIG. 36.

FIG. 38 is a side elevation of the cage of the valve of FIGS. 36 and 37.

FIG. 39 is a vertical cross-sectional view of a portion of another top-entry check valve constructed in accordance with the present invention.

FIG. 40 is a top plan view of the valve of FIG. 39 with the bonnet detached.

FIG. 41 is a cross-sectional view along lines 41—41 of FIG. 39.

FIG. 45 is a vertical cross-sectional view of a portion of another top-entry check valve constructed in accordance with the present invention.

FIG. 46 is a cross-sectional view taken along lines 46—46 of FIG. 45.

FIG. 47 is a cross-sectional view taken along lines 47—47 of FIG. 46.

FIG. 48 is an elevational view of the unitary seat and cage of FIG. 45 from the downstream side.

FIG. 49 is a side elevation of the unitary seat and cage of FIG. 48.

FIG. 50 is an elevational view of the unitary seat and cage of FIG. 48 from the upstream side.

FIG. 51 is a vertical cross-sectional view of a portion of another form of top-entry check valve constructed in accordance with the present invention.

FIG. 52 is a cross-sectional view taken along lines 52—52 of FIG. 51.

FIG. 60 is an exploded elevational view of the cage and cushion spring support of FIG. 55 from the downstream side. The cushion spring is not shown for clarity of illustration.

FIG. 61 is an exploded side elevation of the cage and cushion spring support of FIG. 60.

FIG. 62 is an exploded elevational view of the cage and cushion spring support of FIG. 60 from the upstream side.

DETAILED DESCRIPTION OF THE PREFERRED EMBODIMENTS

Figure 10:
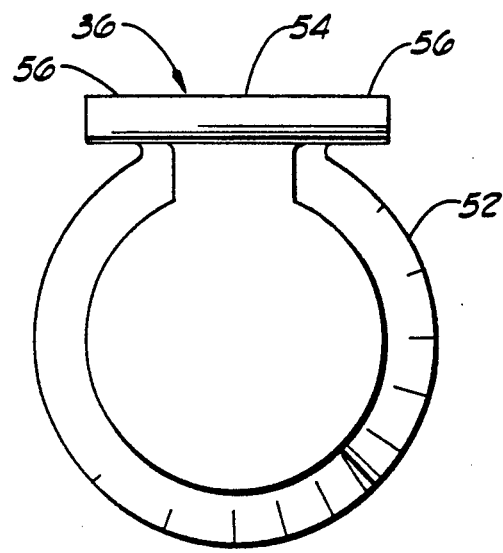
FIG. 10 is an elevational view of the disc of FIGS. 4, 5 and 6 from the downstream side.

Referring now to the drawings in detail, and to FIG. 1 in particular, the reference numeral 10 generally designates a prior art top-entry check valve. Flow into the valve 10 is indicated by the straight arrows 11. As illustrated by the swirling arrows 12, turbulent flow is created by the high bonnet 14 and large cavity 16. This construction requires machining inside the valve body for the hinge 18 and valve seat 19.

FIG. 2 illustrates a typical top-entry check valve 20 constructed in accordance with the present invention. Flow into the valve 20 is designated by the straight arrows 21. The arrows 22 illustrate the smooth, even flow through valve 20. The improved flow is a result of the relatively straight lines of the valve body 24. The bonnet 26 forms the top wall of the valve chamber 28, such that there is virtually no cavity between the bonnet and the valve chamber, as contrasted with the existence of a cavity 16 in the prior art valve 10. The distance from the center-line 27 of the body 24 to the bottom of the bonnet 26 is approximately the same as the distance from the center-line to the bottom of the valve chamber.

FIG. 3 is a comparison of a conventional, prior art top-entry check valve 10 (partially in outline) and a check valve 20 constructed in accordance with the present invention (shown in full lines). This comparison illustrates the reduction in size and weight accomplished by the present invention. The drawing also shows the use of flanges 29 at the upstream and downstream ends of the valve 20, although it will be understood that the valve body 24 can be fitted with any desired connecting arrangement.

It will also be understood that the following embodiments include the use of standard seals, such as elastomeric O-ring seals, to provide fluid-tight engagement between various surfaces. Such seals are installed in a conventional manner where needed to prevent leakage of fluid between the valve components. These seals are omitted from the drawings in order to illustrate more clearly the preferred embodiments of the present invention.

Embodiment of FIGS. 4 through 12

In FIGS. 4, 5 and 6, the central portion of a valve 20 constructed in accordance with the present invention is shown enlarged. As shown in these figures, the valve chamber 28 receives a valve cartridge assembly, generally designated by reference character 30. The valve cartridge assembly 30 controls the flow of fluid through the valve 20. The valve cartridge assembly 30 basically comprises a unitary seat and cage member 34 and a valve disc 36 supported on the member 34. As best shown in FIG. 5, an access opening 39 allows installation and removal of the valve cartridge assembly 30, when the bonnet 26 is detached from the valve body 24.

The unitary seat and cage 34 of the valve 20 is shown separately in FIGS. 7, 8 and 9. The seat/cage 34 is generally circular with a flow opening 42 therethrough. An annular seating face 44 around the flow opening 42 is sized and shaped to mate with the disc 36. A pair of hinge pin supports 46 extend generally radially in the seat/cage 34 to suspend the disc 36 in the valve cartridge assembly 30. As best shown in FIG. 8, a reduced diameter extension 47 is formed on the upstream end 48 of the unitary seat and cage 34 and an annular shoulder 49 extends around the unitary seat and cage member 34. FIG. 8 also illustrates that the hinge pin supports 46 are generally U-shaped in cross-section. As best shown in FIG. 7, a pair of projections 50 extend from the downstream side of the annular shoulder 49 of the seat/cage 34 and the upper surface 51 of the annular shoulder 49 is flattened.

Figure 11:
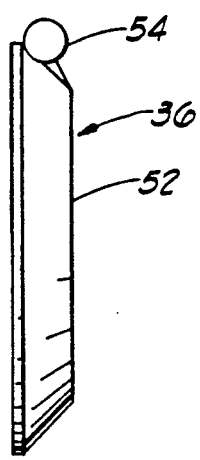
FIG. 11 is a side elevation of the disc of FIG. 10.
Figure 12:
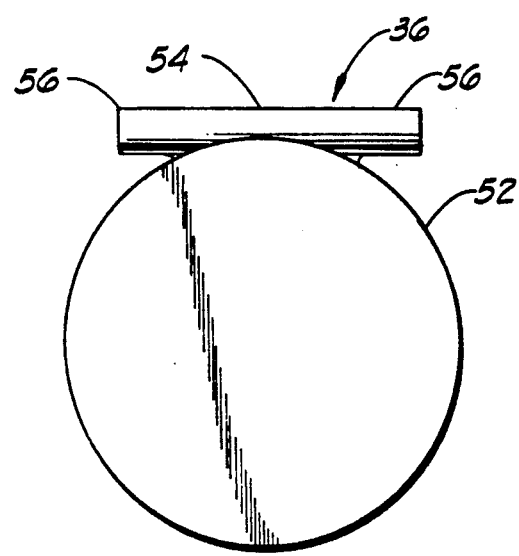
FIG. 12 is an elevational view of the disc of FIG. 10 from the upstream side.

The disc 36 of the valve 20 is shown separately in FIGS. 10, 11 and 12. The disc 36 is a generally circular flat plate 52. At least one hinge pin 54, with end portions 56, extends at a tangent from the plate 52. As discussed hereinafter, the end portions 56 of the hinge pin 54 pivotally support the disc 36 within the valve 20.

The arrangement of the valve cartridge assembly 3 in the valve chamber 28 is disclosed in FIGS. 4, 5 and 6. As described hereinabove, the valve cartridge assembly 30 comprises the unitary seat and cage member 34 and the valve disc 36. The reduced diameter extension 47 of the seat and cage member 34 fits into a mating counterbore 72 of the valve body 24. The counterbore 72 forms an annular shoulder 74 facing downstream to mate with the upstream end 48 of the seat/cage 34. This arrangement prevents movement of the valve cartridge assembly 30 in the upstream direction indicated by arrow 76.

As best illustrated by FIG. 4, the hinge pin supports 46 of the unitary seat and cage member 34 cradle the end portions 56 of the hinge pin 54 of the disc 36 to suspend the disc 36 within the valve cartridge assembly 30. The disc 36 pivots about the axis of the hinge pin 54 to close against the seating face 44 of the unitary seat and cage member 34 and prevent flow through the valve cartridge assembly 30 in the upstream direction 76. Conversely, the disc 36 pivots about the axis of the hinge pin 54 to open away from the seating face 44 of the unitary seat and cage 34 to allow unobstructed flow through the valve cartridge assembly 30 in the downstream direction 32. One side of each hinge pin support 46 is bent over to trap the hinge pin 54 therein. Also, the space in each hinge pin support 46 is wider than the diameter of the hinge pin 54 to permit the disc 36 to "float" when in a near closed position.

As shown in FIGS. 4 and 5, the valve body 24 has a pair of lugs 82 extending into the valve chamber 28. The lugs 82 are located in the valve chamber 28 to engage the projections 50 of the seat and cage 34 when the reduced diameter extension 47 is installed in the counterbore 72. This arrangement prevents movement of the valve cartridge assembly 30 in the downstream direction 32.

As best illustrated by FIG. 5, the valve cartridge assembly 30 is readily accessible for installation or removal with the bonnet 26 detached from the valve body 24. To install the valve cartridge assembly 30 in the valve chamber 28, the valve cartridge assembly 30 is rotated approximately 90 degrees or at least enough for the projections 50 to be clear of the lugs 82. With the projections 50 unobstructed by the lugs 82, the valve cartridge assembly 30 can be moved in the downstream direction until the reduced diameter extension 47 is out of the counterbore 72. The valve cartridge assembly 30 can then be removed from the valve chamber 28 through the access opening 39.

Installation of the valve cartridge assembly 30 is accomplished in a similar manner. With the bonnet 26 detached, the valve cartridge assembly 30 is placed in the valve chamber 28 with the projections 50 extending downstream and rotated to a position wherein the projections 50 are clear of the lugs 82. The valve cartridge assembly 30 is moved in the upstream direction 76 until at least a portion of the reduced diameter extension 47 extends into the mating counterbore 72. The distance from the upstream end 48 of the seat/cage 34 to the downstream end of the projections 50 is, preferably, by design, 0.002 to 0.003 inches less than the distance from the annular shoulder 74 to the lugs 82. When the valve cartridge assembly 30 is rotated to the installed position, therefore, the projections 50 are in virtual engagement with the lugs 82 to limit downstream movement of the cartridge 30. The bonnet 26 is attached and, as shown in FIGS. 4 and 6, the bonnet 26 engages the flattened upper surface 51 of the annular shoulder 49 to prevent transverse rotation of the valve cartridge assembly 30 after installation. This construction allows easy replacement of the seat/cage 34 or disc 36 individually, or of the valve cartridge assembly 30 as a unit.

Embodiment of FIGS. 13 through 21

Figure 13:
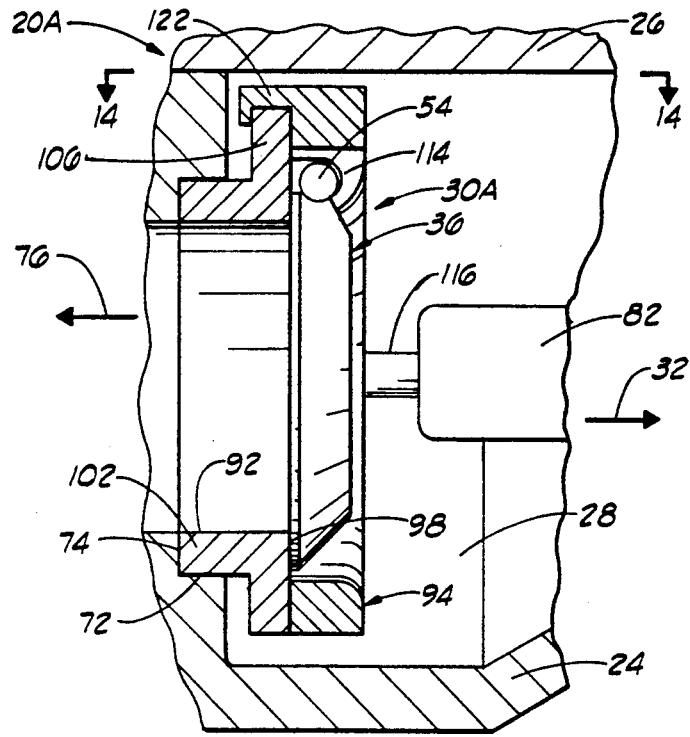
FIG. 13 is a vertical cross-sectional view of a portion of another form of top-entry check valve constructed in accordance with the present invention.

Referring now to FIG. 13, reference character 20A designates another form of a valve constructed in accordance with the present invention. This particular embodiment utilizes a valve cartridge assembly 30A comprising a separate seat 92 and cage 94 with the valve disc 36.

Figure 15:
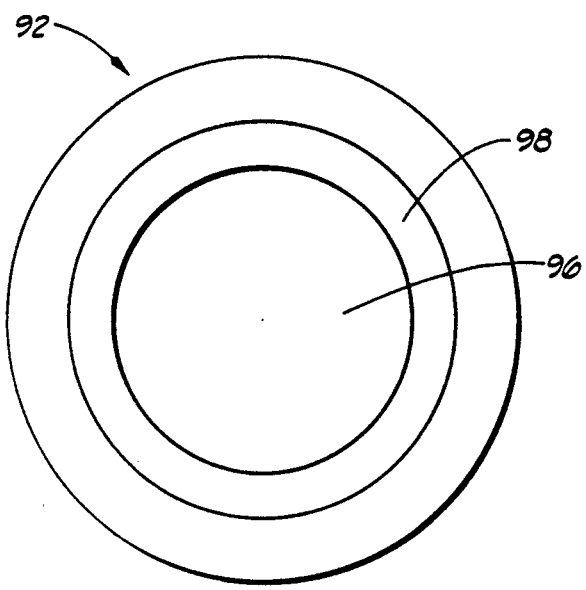
FIG. 15 is an elevational view of the seat of the valve of FIGS. 13 and 14 from the downstream side.
Figure 16:
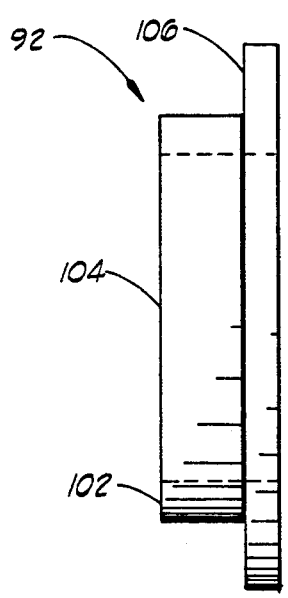
FIG. 16 is a side elevation of the seat of FIG. 15.
Figure 17:
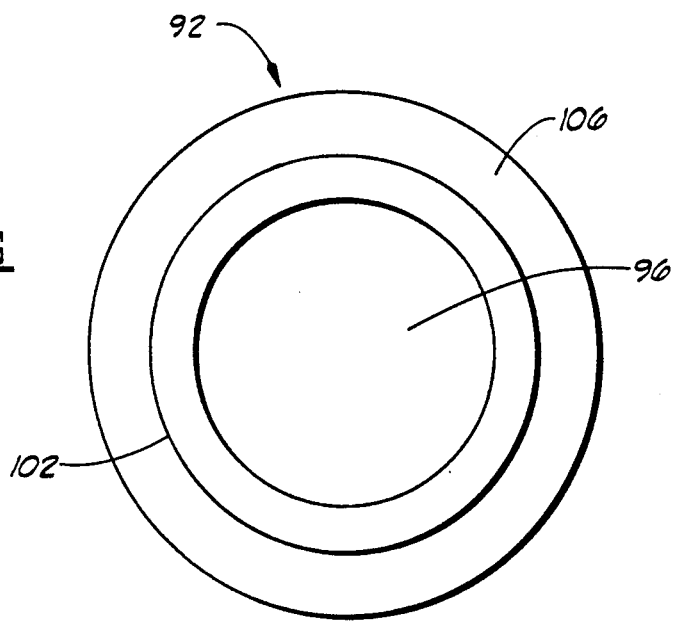
FIG. 17 is an elevational view of the seat of FIG. 15 from the upstream side.

The seat 92 is shown separately in FIGS. 15, 16 and 17. The seat 92 is generally circular with a flow opening 96 therethrough. An annular seating face 98 around the flow opening 96 is sized and shaped to mate with the disc 36. As best shown in FIG. 16, a reduced diameter extension 102 is formed on the upstream end 104 of the seat 92 and an annular shoulder 106 extends around the seat 92.

The cage 94 is shown separately in FIGS. 18 and 19. The cage 94 is generally circular in shape with a flow opening 112 therethrough. A pair of hinge pin supports 114 are formed in the cage 94 to suspend the disc 36 in the valve cartridge assembly 30. As best shown in FIG. 18, the hinge pin supports 114 face upstream and are generally U-shaped in cross-section. A pair of projections 116 extend from the downstream side 118 of the cage 94. An upstream extension 122 of the cage 94 is sized and shaped to mate with the annular shoulder 106 of the seat 92. A cut-out 124 is formed between the hinge pin supports 114.

Figure 14:
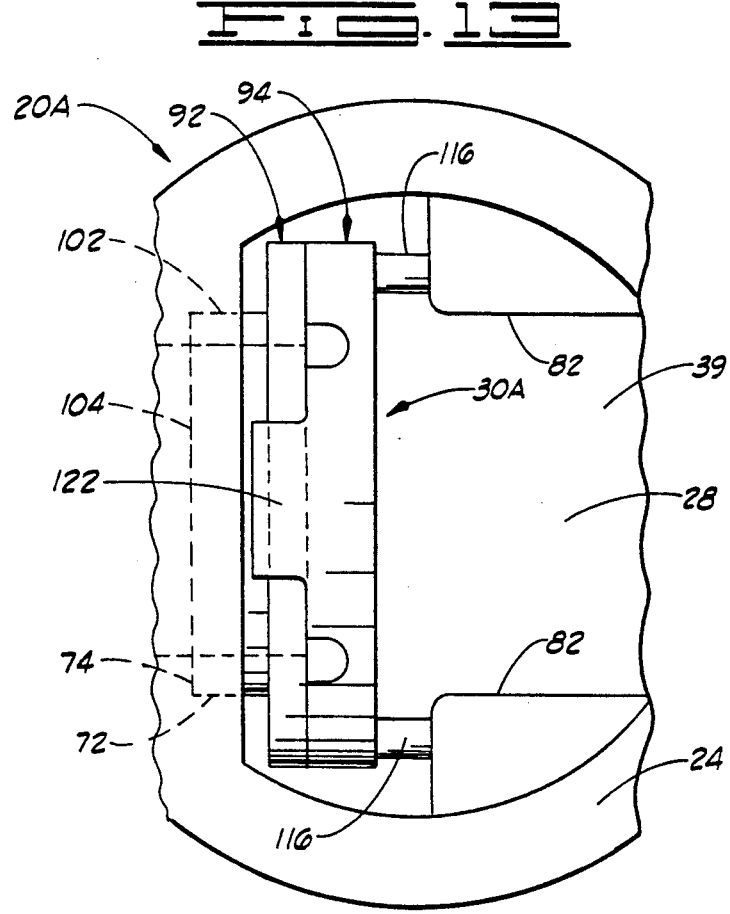
FIG. 14 is a cross-sectional view taken along lines 14—14 of FIG. 13.

The arrangement of the valve cartridge assembly 30A in the valve chamber 28 is disclosed in FIGS. 13 and 14. As described hereinabove, the valve cartridge assembly 30A comprises the valve seat 92, the cage 94, and the valve disc 36. The reduced diameter extension 102 of the seat 92 fits into the mating counterbore 72 of the valve body 24. The annular shoulder 74 of the counterbore 72 engages the upstream end 104 of the seat 92 to prevent movement of the valve cartridge assembly in the upstream direction 76.

As best illustrated by FIG. 13, the hinge pin supports 114 of the cage 94 cradle the end portions 56 of the hinge pin 54 of the disc to suspend the disc 36 within the valve cartridge assembly 30A. The disc 36 pivots about the axis of the hinge pin 54 to close against the seating face 98 of the seat 92 and prevent flow through the valve cartridge assembly 30A in the upstream direction 76. Conversely, the disc 36 pivots about the axis of the hinge pin 54 to open away from the seating face 98 of the seat 92 and allow unobstructed flow through the valve cartridge assembly 30A in the downstream direction 32. The width of the space in each hinge pin support 114 is greater than the diameter of the hinge pin 54 to allow the disc 36 to "float" in a near closed position.

Continuing to refer to FIG. 13, the upstream extension 122 of the cage 94 mates with the annular shoulder 106 of the seat 92 to secure the seat 92 to the cage 94. Each projection 116 of the cage 94 extends downstream to engage the respective lug 82 of the valve body 24 and prevent movement of the valve cartridge assembly 30A in the downstream direction 32. The downstream face of the seat 92 traps the hinge pin 54 of the disc 36 in the hinge pin supports 114 of the cage 94, preventing the disc 36 from being dislodged from the valve cartridge assembly 30A. The cut-out 124 of the cage 94 allows the disc 36 to pivot away from the seating face 98 in order to permit unobstructed flow through the valve cartridge assembly 30A in the downstream direction 32.

Referring to FIG. 14, the valve cartridge assembly 30A is readily accessible with the bonnet 26 detached and is installed and removed in the manner disclosed hereinabove. The construction of the valve cartridge assembly 30A allows easy replacement of the seat 92, cage 94 and disc 36 individually, or of the valve cartridge assembly 30A as a unit.

FIGS. 20 and 21 shown another form of a cage 94A constructed in accordance with the present invention. This embodiment is exactly like the cage 94 except that the projections 116A are threaded and each projection 116A screws into a threaded hole 126 in the cage 94A. This construction permits replacement of the projections 116A with projections 116A of the same or different lengths.

Embodiment of FIGS. 22 through 27

Figure 22:
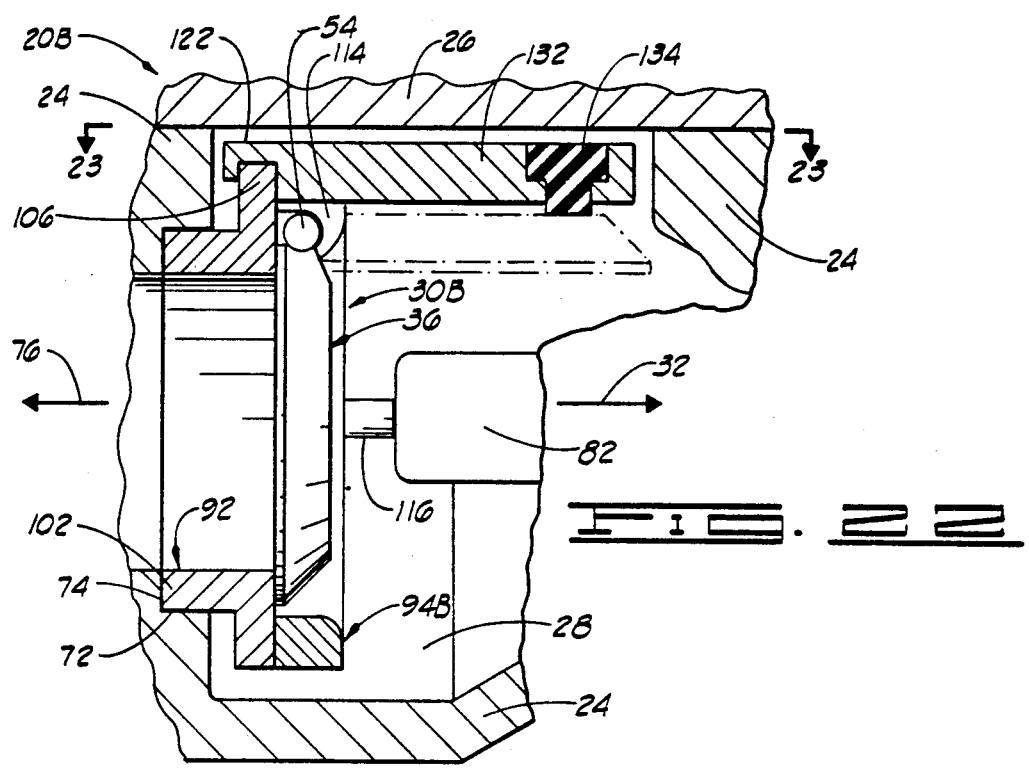
FIG. 22 is a vertical cross-sectional view of a portion of another form of top-entry check valve constructed in accordance with the present invention.

Referring now to FIG. 22, reference character 20B designates another form of a valve constructed in accordance with the present invention. The cage 94B is modified to include a downstream extension 132 at the top thereof.

The cage 94B is shown separately in FIGS. 24 and 25. A cushion 134, as of elastomeric material, is attached to the downstream extension 132 of the cage 94B and protrudes from the bottom surface 136 of the downstream extension 132.

Figure 23:
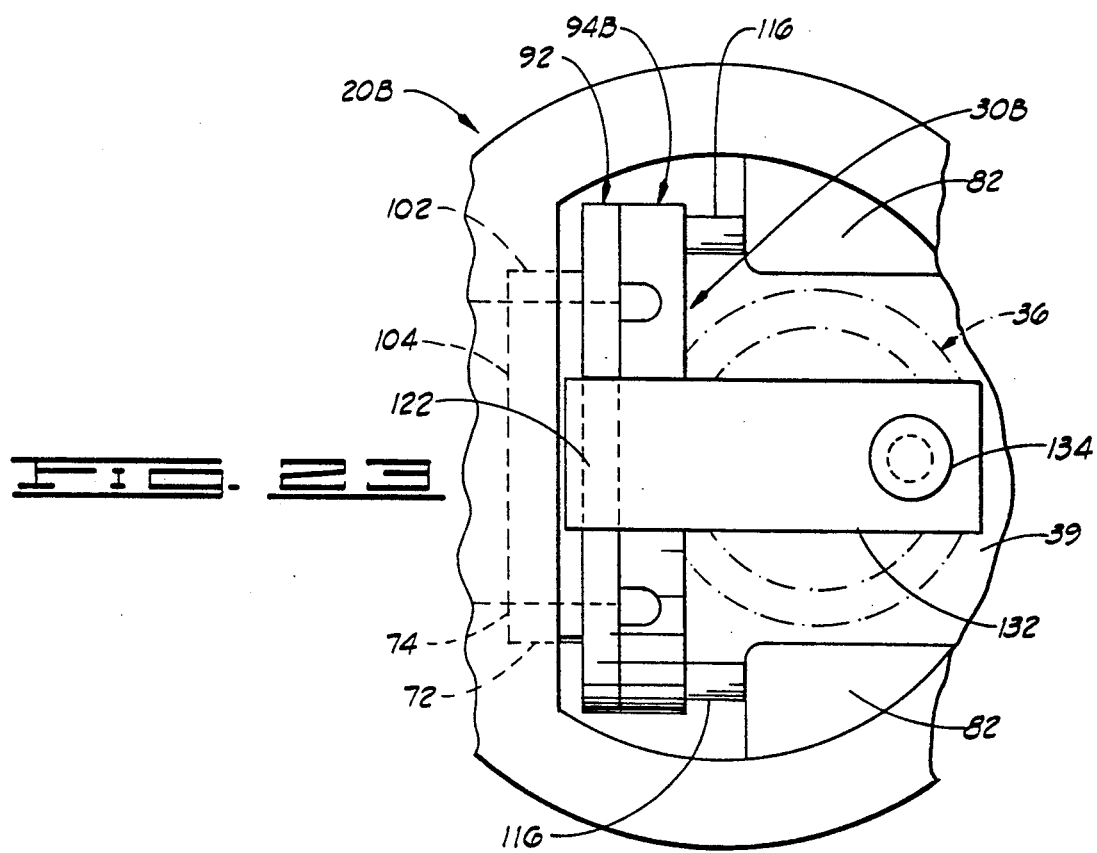
FIG. 23 is a cross-sectional view taken along lines 23—23 of FIG. 22.

As shown in FIGS. 22 and 23, the disc 36 strikes the cushion 134 of the downstream extension 132 of the cage 94B before reaching the valve body 24 or the bonnet 26 when the disc 36 swings open away from the seating face 98 of the seat 92. The disc 36 in the open position is illustrated by phantom lines in FIG. 22. The cushion 134 absorbs the impact of a forceful opening of the disc 36, reducing wear on the disc 36 and prolonging the useful life of the disc 36 as well as the body 24 and/or bonnet 26.

FIGS. 26 and 27 show another form of a cage 94X constructed in accordance with the present invention. The cage 94X is exactly like the cage 94B, except that each projection 116X is threaded at one end and screws into a threaded hole 126X in the cage 94X.

As shown in FIG. 23, the valve cartridge assembly 30B is readily accessible with the bonnet 26 detached from the valve body 24. The installation and removal of the valve cartridge assembly 30B is accomplished as described hereinabove. It will be appreciated that the access opening 39 must be large enough for the valve cartridge assembly 30B, with the downstream extension 132 of the cage 94B, to pass therethrough.

Embodiment of FIGS. 28 through 35

Figure 28:
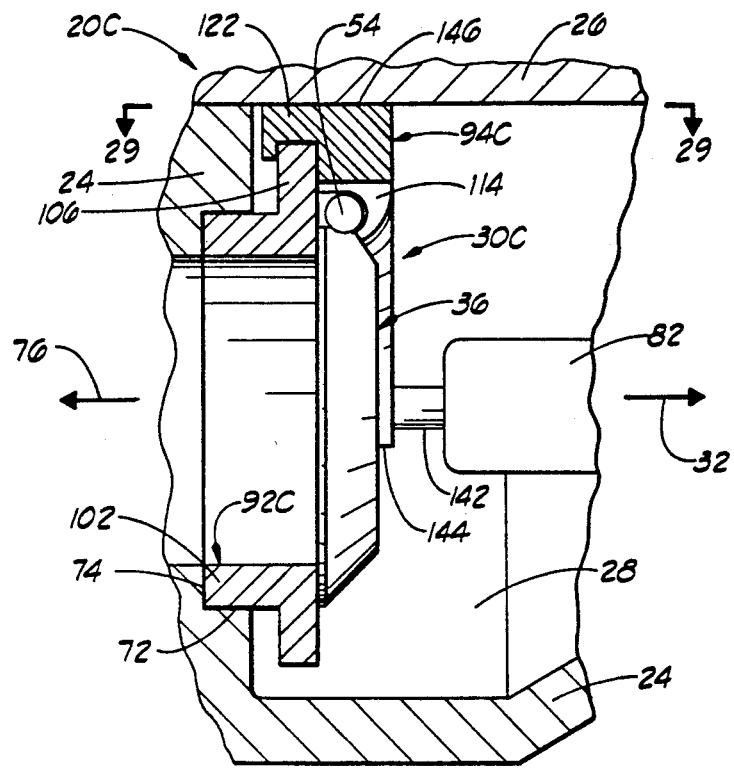
FIG. 28 is a vertical cross-sectional view of a portion of yet another form of top-entry check valve constructed in accordance with the present invention.
Figure 29:
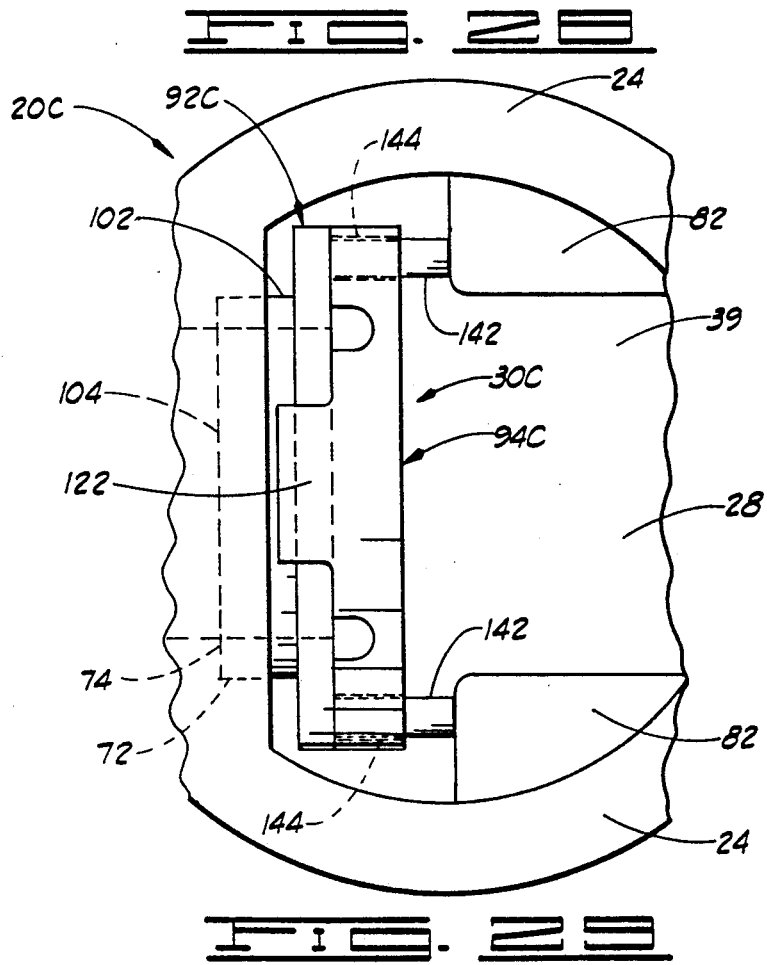
FIG. 29 is a cross-sectional view taken along lines 29—29 of FIG. 28.

Referring now to FIGS. 28 and 29, reference character 20C designates another form of a valve constructed in accordance with the present invention. This particular embodiment utilizes a valve cartridge assembly 30C, comprising the modified seat 92C, the modified cage 94C, and the disc 36.

As best shown in FIG. 28, the cage 94C extends around only a portion of the seat 92C. As FIG. 29 illustrates, a pair of projections 142 extend downstream from the seat 92C, through the cage 94C, and engage the lugs 82 of the valve body 24.

The valve seat 92C is shown separately in FIGS. 30 and 31. The seat 92C is identical to the seat 92, except that projections 142 extend downstream from the seat 92C outside the seating face 98 of the seat 92C.

The cage 94C is shown separately in FIGS. 34 and 35. The cage 94C is exactly like the cage 94, except that the cage 94C is generally semi-circular in shape (rather than circular), has a U-shaped slot 144 at each open end of the semi-circle, and has no projections extending downstream. The cage 94C also has a flat upper surface 146.

The arrangement of the valve cartridge assembly 30C in the valve chamber 28 is disclosed in FIGS. 28 and 29. As described hereinabove, the valve cartridge assembly 30C comprises the seat 92C, the cage 94C and the disc 36. With the reduced diameter extension 102 of the seat 92C installed in the mating counterbore 72, each projection 142 of the seat 92C engages one of the lugs 82 of the valve body 24 to prevent movement of the valve cartridge assembly 30C in the downstream direction 32.

Each U-shaped slot 144 of the cage 94C is sized and shaped to fit over one of the projections 142 of the seat 92C with the projection 142 extending through the U-shaped slot 144. The extension 122 of the Cage 94C mates With the annular shoulder 106 of the seat 92C. The attached bonnet 26 engages the flat upper surface 146 of the cage 94C to secure the cage 94C in place.

As shown in FIG. 29, the valve cartridge assembly 30C is readily accessible with the bonnet 26 detached. Installation and removal of the valve cartridge assembly 30C is accomplished in much the same manner as described hereinabove. In this particular embodiment, however, the cage 94C and disc 36 may simply be lifted out of the valve chamber 28 through the access opening 39 without rotating the valve cartridge assembly 30C. Replacement of the seat 92C requires rotation of the seat 92C until the projections 142 disengage the lugs 82. Then the seat 92C is free to move and the reduced diameter extension 102 can be installed into or removed from the counterbore 72.

In FIGS. 32 and 33, another form of the seat constructed in accordance with the present invention is designated by reference character 92D. The seat 92D is identical to the seat 92C except for a modification with respect to the projections 142. Each projection 142D of the seat 92D has a threaded end which screws into a threaded hole 148 in the seat 92D. This construction allows replacement of the projections 142D with projections of the same or different lengths.

Embodiment of FIGS. 36 through 38

Referring now to FIGS. 36, 37 and 38, reference character 30D designates still another form of a valve constructed in accordance with the present invention. This particular embodiment utilizes a valve cartridge assembly 30D, comprising a seat 92D, a modified cage 94D, and a disc 36.

As shown in these figures, the cage 94D has a downstream extension 132 with a cushion 134 as previously described. As best shown in FIG. 36, the disc 36 strikes the cushion 134 to prevent the disc 36 from hitting the extension 132, the bonnet 26 or the valve body 24, when the disc 36 swings open away from the seating face 98. The disc 36 in the open position is illustrated by phantom lines in FIG. 36. The cushion 134 absorbs the force of the opening of the disc 36 to reduce wear on the disc 36 and to prolong the useful life of the valve cartridge assembly 30D and/or bonnet 26 and body 24.

As illustrated by FIG. 37, the valve cartridge assembly 30D is readily accessible with the bonnet 26 detached. The valve cartridge assembly 30D is installed and removed as described hereinabove. In another preferred embodiment, the valve seat 92C is utilized in place of the seat 92D with the cage 94D and disc 36 arranged as disclosed for the valve cartridge assembly 30D.

Embodiment of FIGS. 39 through 44

Referring now to FIGS. 39, 40 and 41, reference character 20E designates another form of a valve constructed in accordance with the present invention. This particular embodiment utilizes a valve cartridge assembly 30E comprising a modified unitary seat and cage 34E and the valve disc 36. Modifications are also made with respect to the valve body 24E and the bonnet 26E.

Figure 42:
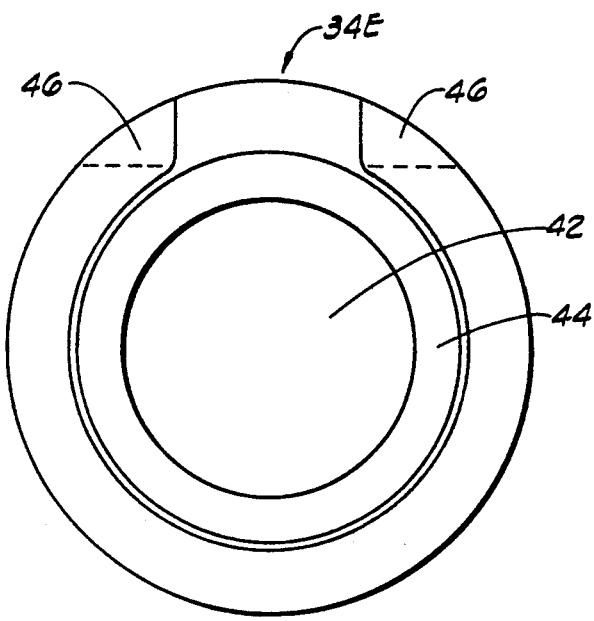
FIG. 42 is an elevational view of the unitary seat and cage of the valve of FIGS. 39, 40 and 41 from the downstream side.
Figure 43:
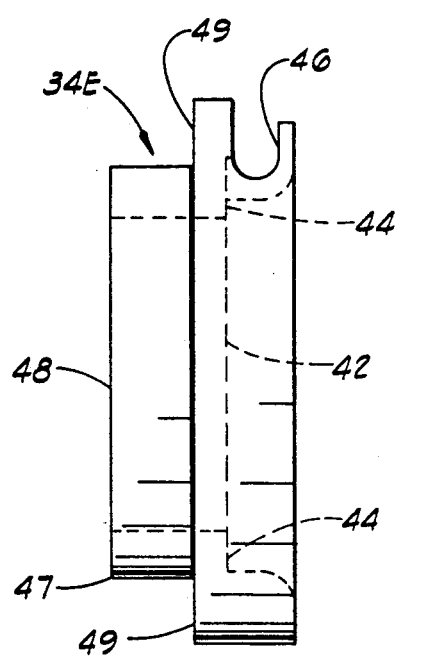
FIG. 43 is a side elevation of the unitary seat and cage of FIG. 42.
Figure 44:
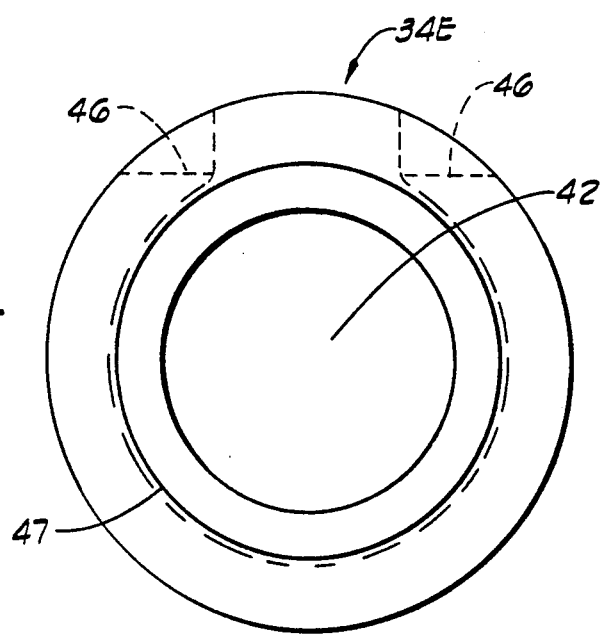
FIG. 44 is an elevational view of the unitary seat and cage of FIG. 42 from the upstream side.

The unitary seat and cage member 34E is shown separately in FIGS. 42, 43 and 44. The seat/cage 34E is identical to the seat/cage 34, except that seat/cage 34E has no projections extending downstream.

FIGS. 39, 40 and 41 show the arrangement of the valve cartridge assembly 30E in the valve chamber 28. As best shown in FIG. 39, a projection 150 extends from the bonnet 26E into the valve chamber 28 and engage the downstream side of the annular shoulder 49 of the unitary seat and cage 34E. This arrangement prevents movement of the valve cartridge assembly 30E in the downstream direction 32. The projection 150 also traps the hinge pin 54 of the disc 36 in the hinge pin supports 46 of the unitary seat and cage 34E to keep the disc 36 from becoming dislodged from the valve cartridge assembly 30E. It will be appreciated that there is no need for lugs in the valve body 24E in this particular embodiment.

As illustrated by FIG. 40, the valve cartridge assembly 30D is readily accessible with the bonnet 26E detached. The valve cartridge assembly 30E is installed by simply sliding the reduced diameter extension 47 of the unitary seat and cage 34E into the counterbore 72 of the valve body 24E. Removal of the valve cartridge assembly 30E is accomplished by merely sliding the reduced diameter extension 47 downstream out of the counterbore 72 and extracting the valve cartridge assembly 30E through the access opening 39. This construction permits easy replacement of the unitary seat/cage 34E or disc 36 individually, or of the valve cartridge assembly 30E as a unit.

Embodiment of FIGS. 45 through 50

Referring now to FIG. 45, reference character 20F designates another form of valve constructed in accordance with the present invention. In this particular embodiment, the unitary seat and cage 34F and valve body 24F are modifications of the seat and cage 34 and valve body 24, respectively.

As shown in FIGS. 45 and 46, the valve body 24F is formed without the mating counterbore 72. Instead of the mating counterbore 72, the valve body 24F includes a downstream face 152 in the valve chamber 28. The downstream face 152 engages the upstream end 48F of the unitary seat and cage 34F to prevent movement of the valve cartridge assembly 30F in the upstream direction 76. The valve body 24F also includes a positioning lug 154, protruding from the valve body 24F into the valve chamber 28. As best shown in FIGS. 45 and 47, the positioning lug 154 supports the valve cartridge assembly 30F in alignment with the flow through the valve chamber 28. Resting on the positioning lug 154, the valve cartridge assembly 30F is aligned for the disc 36 to prevent flow through the valve chamber 28 in the upstream direction 76.

The unitary seat and cage 34F is shown separately in FIGS. 48, 49 and 50. As illustrated by these figures, the seat and cage 34F is exactly like the seat and cage 34, except that the reduced diameter extension 47 is eliminated in the seat and cage 34F. Without the reduced diameter extension 47, the upstream end 48F of the seat and cage 34F is an annular surface facing upstream and having the same outside diameter as the outside diameter of the annular shoulder 49.

Embodiment of FIGS. 51 and 52

Referring now to FIG. 51, reference character 20G designates a portion of another form of top-entry check valve constructed in accordance with the present invention. This particular embodiment utilizes modified projections 50G and modified lugs 82G.

As shown in FIGS. 51 and 52, the valve 20G is the same as valve 20F, except that the upstream face of each lug 82G is not vertical, but slopes in the downstream direction 32 from the bottom to the top of the lug 82G. Accordingly, the upper portion of the upstream face of each lug 82G is further downstream than the lower portion of the upstream face of the lug 82G. Each projection 50G has a downstream end to mate with the respective lug 82G. With this arrangement, the engagement of each projection 50G with the corresponding lug 82G assists in aligning the valve cartridge assembly 30G in the valve chamber 28 in order that the disc 36 may prevent flow in the upstream direction 76.

Figure 53:
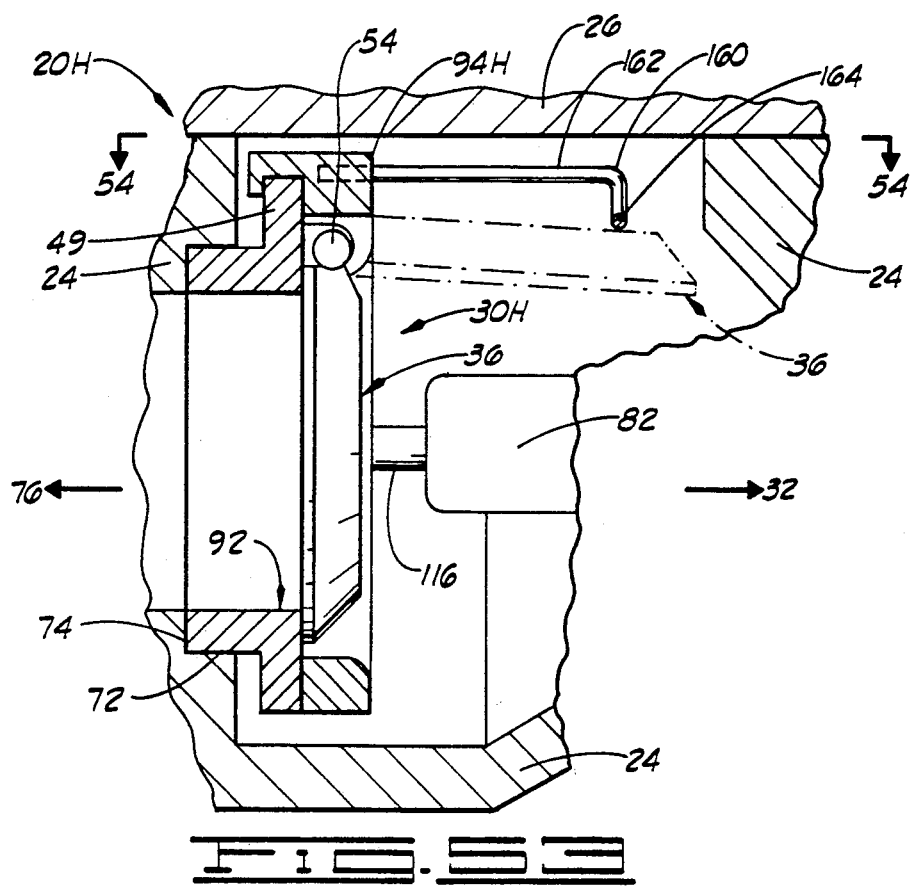
FIG. 53 is a vertical cross-sectional view of a portion of another form of top-entry check valve constructed in accordance with the present invention.
Figure 54:
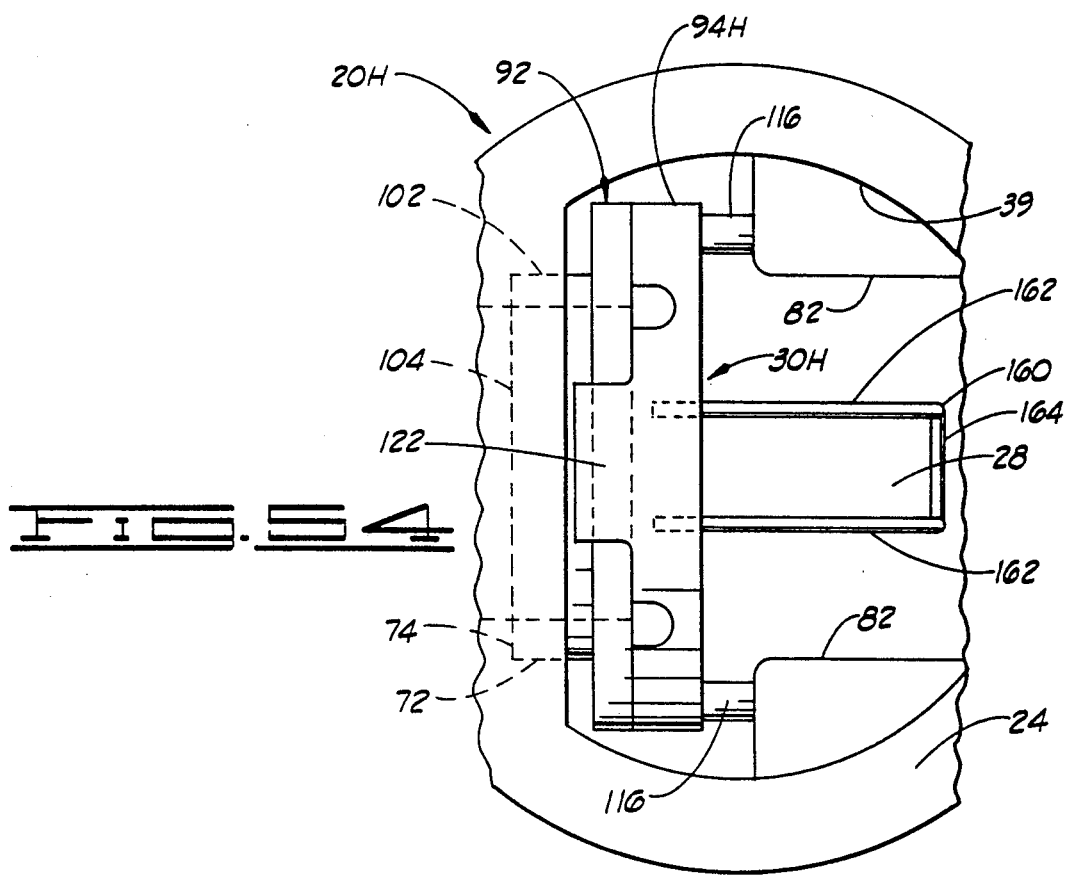
FIG. 54 is a cross-sectional view taken along lines 54—54 of FIG. 53.

Embodiment of FIGS. 53 and 54

Referring now to FIG. 53, reference character 20H designates a portion of another top-entry check valve constructed in accordance with the present invention. This particular embodiment utilizes the cage 94H, which is a modification of the cage 94.

As shown in FIG. 53, the cage 94H includes a cushion spring 160 extending from the downstream end of the cage 94H. When the disc 36 opens rapidly, as indicated by the phantom lines, the disc 36 strikes the cushion spring 160 before the disc 36 reaches the bonnet 26 or the valve body 24. The cushion spring 160 absorbs the impact of the disc 36 when the disc 36 opens rapidly to allow fluid flow in the downstream direction 32. By preventing forceful impact of the disc 36 with the bonnet 26 or valve body 24, the cushion spring 160 reduces wear and prolongs the useful life of the disc 36, bonnet 26 and valve body 24.

As illustrated by FIGS. 53 and 54, the cage 94H is exactly like the cage 94 except that the cage 94H further comprises the cushion spring 160. As best shown in FIG. 54, the cushion spring 160 is generally U-shaped and includes a pair of substantially parallel legs 162 joined by a transverse leg 164. As FIG. 53 illustrates, at least a portion of each parallel leg 162 is bent down so that the opening disc 36 makes contact with the transverse leg 164 before striking any other surface.

Embodiment of FIGS. 55 through 62

Figure 55:
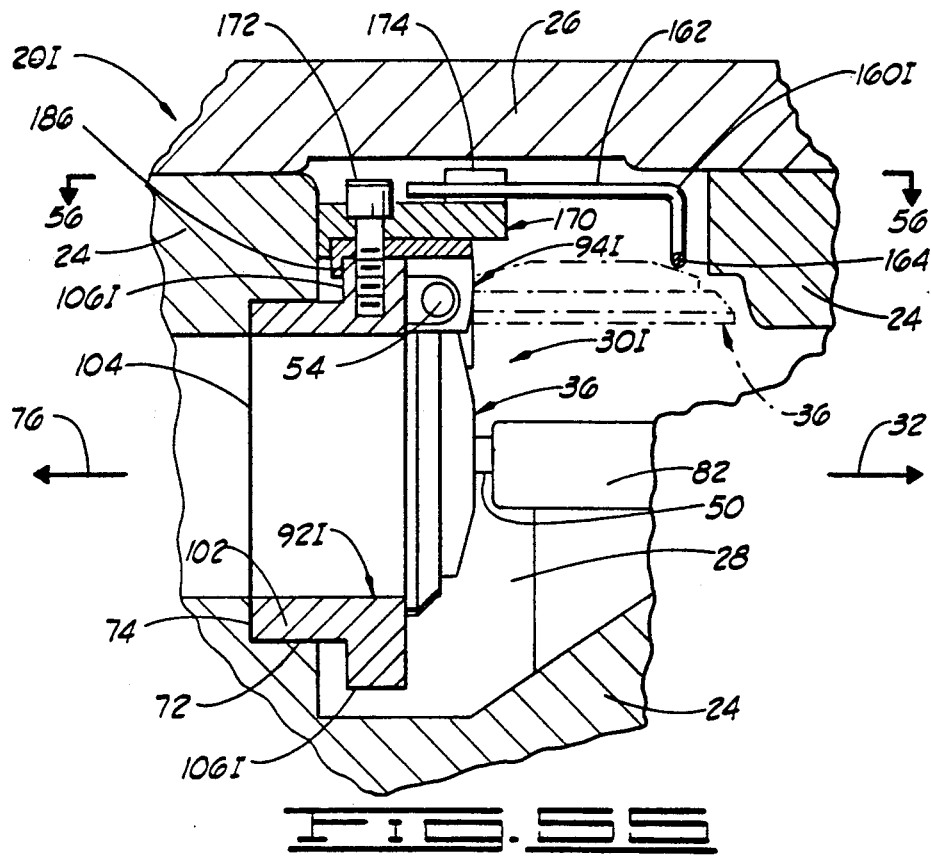
FIG. 55 is a vertical cross-sectional view of a portion of another form of top-entry check valve constructed in accordance with the present invention.

Referring now to FIG. 55, reference character 20I designates another form of top-entry valve constructed in accordance with the present invention. This particular embodiment utilizes the modified seat 92I and the modified cage 94I with a cushion spring support 170 and the cushion spring 160I.

As best shown in FIG. 55, the cushion spring support 170 and cage 94I are secured to the annular shoulder 106I of the seat 92I by a bolt 172. The cushion spring 160I extends downstream from the cushion spring support 170 to meet the opening disc 36 (shown in phantom lines) before the disc 36 can strike the valve body 24 or bonnet 26.

Figure 56:
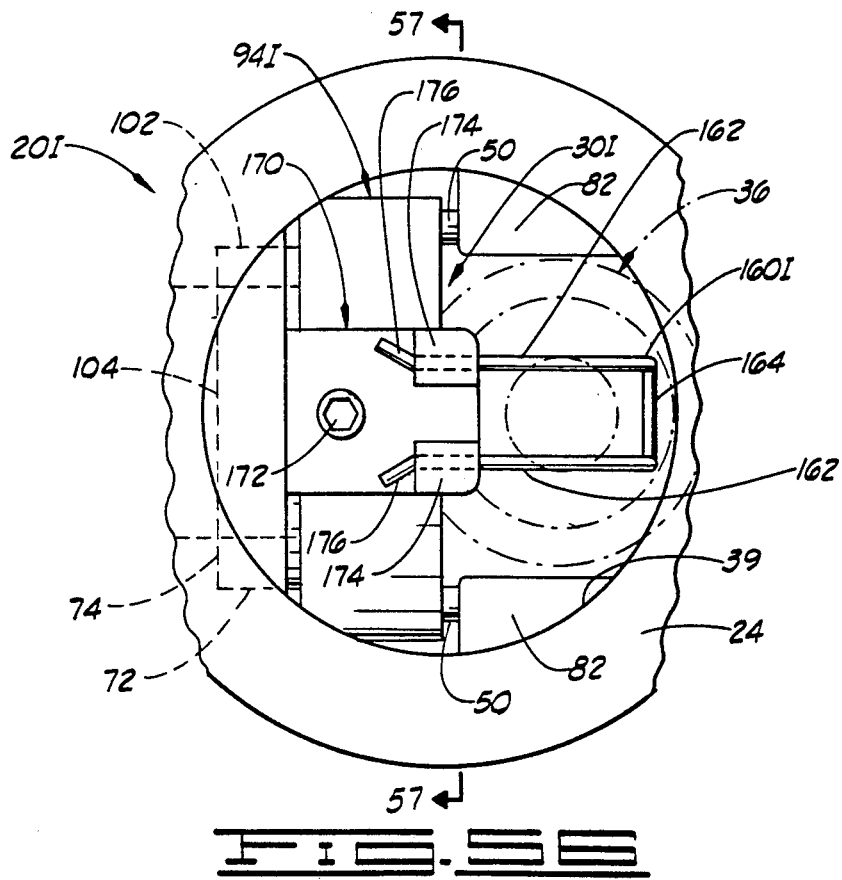
FIG. 56 is a cross-sectional view taken along lines 56—56 of FIG. 55.
Figure 57:
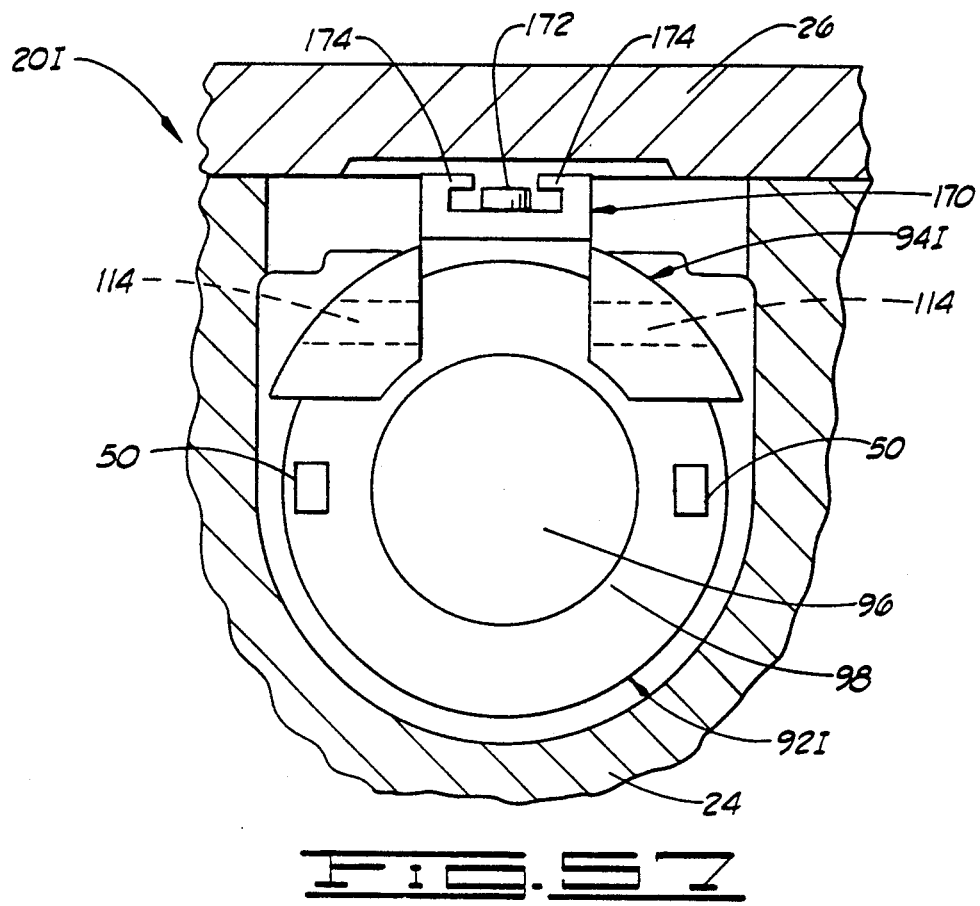
FIG. 57 is a cross-sectional view taken along lines 57—57 of FIG. 56.

As shown by FIG. 56, the cushion spring support 170 includes a pair of cushion spring holders 174 at the downstream end of the cushion spring support 170. As best shown in FIG. 57 (the cushion spring 160I and disc 36 are not shown in this figure for clarity), the cushion spring holders 174 are generally U-shaped in cross-section and are located at the lateral sides of the upper surface of the cushion spring support 170 with the open ends of the U-shapes facing each other. As FIG. 56 illustrates, each lateral leg 162 of the cushion spring 160I fits into the U-shape of the corresponding cushion spring holder 174. The cushion spring 160I is normally biased for pushing the lateral legs 162 of the cushion spring 160I outward into the U-shape of the cushion spring holders 174 to keep the cushion spring 160I within the cushion spring holders 174. As best shown in FIG. 56, a portion of the upstream end 176 of each lateral leg 162 of the cushion spring 160I is bent outward to prevent the cushion spring 160I from being dislodged from the cushion spring holders 174 in the downstream direction 32.

Figures 58, 59:
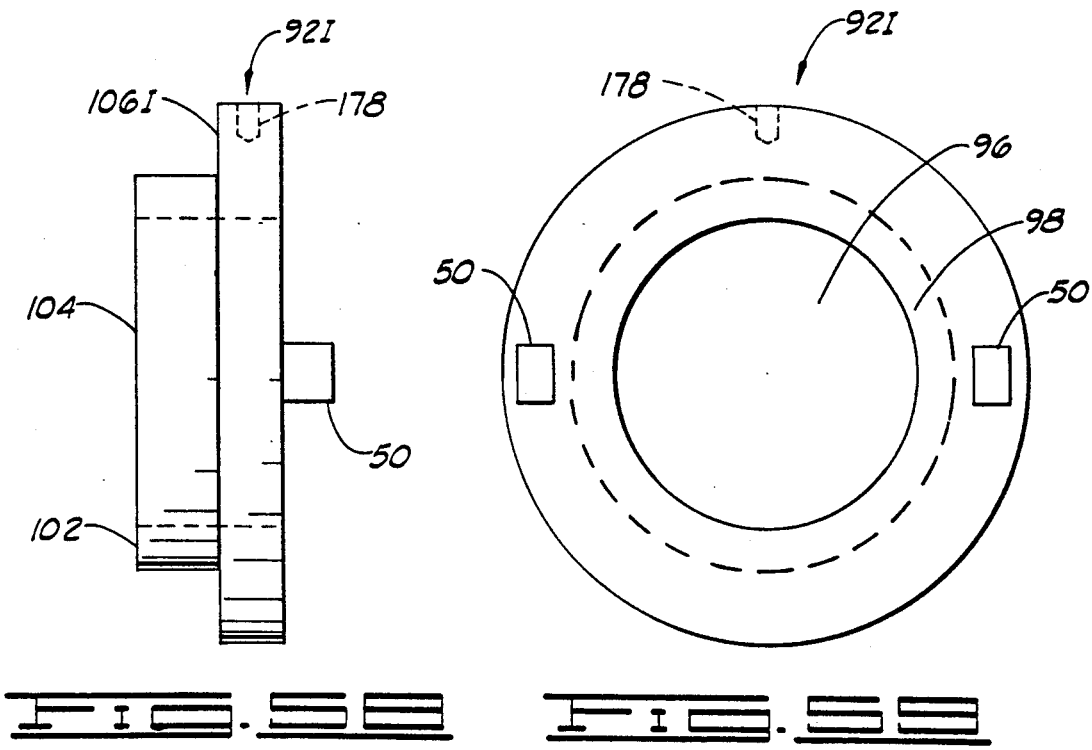
FIG. 58 is a side elevation of the seat of FIG. 55.
FIG. 59 is an elevational view of the seat of FIG. 58 from the downstream side.

FIGS. 58 and 59 show the seat 92I separately. The seat 92I is exactly like the seat 92C except that the top of the annular shoulder 106I has a threaded bolt-hole 178 for securing the cage 94I and cushion spring support 170 with the bolt 172.

FIGS. 60 through 62 show the cage 94I and cushion spring support 170 separately. The cage 94I is similar to the cage 94C in two respects. The hinge pin supports 114 of the cage 94I are generally U-shaped in cross-section and face upstream. The cage 94I also has the downstream cut-out 124 to allow the disc 36 to pivot freely to the open position. The cage 94I, however, includes significant modifications of the cage 94C. The cage 94I is generally in the shape of a partial circle with a flat upper surface 184 for the attachment of the cushion spring support 170. An arcuate recess 186 is formed in the inner surface of the cage 94I. The arcuate recess 186 is shaped to mate with the annular shoulder 106I of the seat 92I. A hole 188 extends from the upper surface 184 of the cage 94I through to the arcuate recess 186. The hole 188 is positioned to align with the bolt-hole 178 in the annular shoulder 106I Of the seat 92I.

Continuing to refer to FIGS. 60 through 62, the cushion spring support 170 is shaped to fit on the upper surface 184 of the cage 94I. The cushion spring support 170 includes a hole 192 which aligns, when assembled, with the hole 188 through the cage 94I and the bolt-hole 178 of the seat 92I. As best shown in FIG. 61, the upstream end of the cushion spring support 170 includes a lip 194 with a downstream face 196 to overhang the cage 94I when installed. When the cushion spring support 170 is attached to the cage 94I, the downstream face 196 of the lip 194 engages the upper upstream face 198 of the cage 94I to keep the cushion spring support 170 from rotating out of position on the upper surface 184 of the cage 94I.

The valve cartridge assembly 30I, which includes the seat 92I, the cage 94I, the disc 36 and the cushion spring support 170 with the cushion spring 160I, is easily installed in the valve chamber 28 with the bonnet 26 detached. As illustrated by FIGS. 55 and 56, the seat 92I is installed with the reduced diameter extension 102 inside the mating counterbore 72 of the valve body 24. The seat 92I is installed by inserting the seat 92I in the valve chamber 28 with the projections 50 extending in the downstream direction 32 in non-alignment with the lugs 82. The seat 92I is moved in the upstream direction 76 until the reduced diameter extension 102 is within the mating counterbore 72. The seat 92I is then transversely rotated until each projection 50 aligns with the corresponding lug 82. After installation of the seat 92I, the cage 94I can merely be slipped over the seat 92I. The cushion spring support 170 with the cushion spring 160I and the cage 94I are then bolted to the seat 92I. Removal of the valve cartridge assembly 30I from the valve chamber 28 is accomplished by generally reversing the installation procedure.

With this arrangement the cage 94I, the cushion spring support 170 and cushion spring 160I can be replaced without disturbing the seat 92I. Moreover, the cushion spring 160I can be replaced without disturbing the cushion spring support 170, the cage 94I, the disc 36 or the seat 92I. The cushion spring 160I is removed from the cushion spring support 170 by compressing the lateral legs 162 toward each other to overcome the bias of the cushion spring 160I and free the lateral legs 162 from the cushion spring holders 174. The cushion spring 160I can then be lifted from the cushion spring holder 170. The cushion spring 160I is installed by squeezing the lateral legs 162 toward each other and releasing each lateral leg 162 into the corresponding cushion spring holder 174. Easy replacement of the cushion spring 160I is an important advantage when it is necessary to replace a worn cushion spring 160I or to install a more resilient or less resilient cushion spring 160I.

Changes may be made in the combinations, operations and arrangements of the various parts and elements described herein without departing from the spirit and scope of the invention as defined in the following claims.

What is claimed is:

1. A top entry check valve, comprising:
   a valve cartridge assembly having upstream and downstream ends, a seat, a cage and a disc, the cage having an upstream extension and a shoulder extending radially outward therefrom, the shoulder of the cage having a downstream facing surface;
   a body having upstream and downstream ends, a valve chamber therein communicating with the upstream and downstream ends thereof, and an access opening in a side wall thereof communicating with the valve chamber of a size to accommodate the entry and removal of the valve cartridge assembly therethrough, said body also having an annular shoulder therein facing downstream sized to engage the upstream extension of the cage and prevent the valve cartridge from moving upstream;
   a bonnet removably attached to the body over said access opening forming a wall of the valve chamber; and a bonnet lug ext ending from the bonnet into the valve chamber alongside the downstream facing surface of the cage and engaging the downstream facing surface of the cage to prevent downstream movement of the valve cartridge assembly.

2. A valve as defined in claim 1 wherein the disc is a generally circular flat plate having at least one hinge pint hereon extending along a tangent to the flat plate, and wherein the seat and cage of the cartridge assembly comprise a unitary structure forming an annular seating face sized to mate with the disc and a pair of hinge pin supports receiving the opposite end portions of the hinge pin.

3. A valve as defined in claim 2 wherein the hinge pin supports are generally U-shaped in cross-section and face radially with respect to the disc and wherein the bonnet lug traps the hinge pin in the hinge pin supports.

4. A valve as defined in claim 2 wherein each hinge pin support is sized larger than the diameter of the hinge pin, whereby the disc can float in upstream and downstream directions in a near-closed position.

5. A valve as defined in claim 2 wherein at least a portion of the outer periphery of the unitary structure fits in a mating counterbore in the valve chamber.

6. A valve as defined in claim 2 wherein the valve chamber defines a straight line flow path between the upstream and downstream ends of the valve body.

7. A valve as defined in claim 6 wherein the bonnet lug extends into the valve chamber to be perpendicular to the straight line flow path between the upstream and downstream ends of the valve body.

8. A valve as defined in claim 1 wherein the bonnet lug is a fixed projection of the bonnet.

9. A top entry check valve, comprising:
a valve cartridge assembly having upstream and downstream ends, a unitary seat and cage and a disc, the unitary seat and cage having an upstream extension and a shoulder extending radially outward therefrom the shoulder of the unitary seat and cage having a downstream facing surface;
a body having upstream and downstream ends, a valve chamber therein communicating with the upstream and downstream ends thereof, and an access opening in a side wall thereof communicating with the valve chamber of a size to accommodate the entry and removal of the valve cartridge assembly therethrough, said body also having an annular shoulder therein facing downstream sized to engage the upstream extension of he unitary seat and cage and prevent the valve cartridge from moving upstream;
a bonnet removably attached to the body over said access opening forming a wall of the valve chamber; and
a bonnet lug extending from the bonnet into the valve chamber alongside the downstream facing surface of the unitary seat and cage and engaging the downstream facing surface of the unitary seat and cage to prevent downstream movement of the valve cartridge assembly.

* * * * *

UNITED STATES PATENT AND TRADEMARK OFFICE
CERTIFICATE OF CORRECTION

PATENT NO. : 5,251,657
DATED : October 12, 1993
INVENTOR(S) : John P. Scaramucci It is certified that error appears in the above-identified patent and that said Letters Patent is hereby corrected as shown below:

Column 2, line 5, delete "of FIG. 6-6".

Column 5, line 9, replace "3" with --30--.

Column 13, line 9, replace "hereon" with --thereon--.

Column 13, line 9, replace "pint" with --pin--.

Signed and Sealed this

Tenth Day of May, 1994

Attest:

BRUCE LEHMAN

Attesting Officer        Commissioner of Patents and Trademarks